US012778107B2

(12) United States Patent
Redden

(10) Patent No.: US 12,778,107 B2
(45) Date of Patent: Nov. 3, 2026

(54) SYSTEM AND METHOD FOR PLANT TREATMENT BASED ON NEIGHBORING EFFECTS

(71) Applicant: Deere & Company, Moline, IL (US)

(72) Inventor: Lee Kamp Redden, Palo Alto, CA (US)

(73) Assignee: Deere & Company, Moline, IL (US)

( * ) Notice: Subject to any disclaimer, the term of this patent is extended or adjusted under 35 U.S.C. 154(b) by 183 days.

(21) Appl. No.: 18/612,794

(22) Filed: Mar. 21, 2024

(65) Prior Publication Data

US 2024/0315232 A1 Sep. 26, 2024

Related U.S. Application Data

(63) Continuation of application No. 17/749,113, filed on May 19, 2022, now Pat. No. 11,974,562, which is a (Continued)

(51) Int. Cl.
*A01M 21/04* (2006.01)

(52) U.S. Cl.
CPC .......... *A01M 21/04* (2013.01); *A01M 21/043* (2013.01); *A01M 21/046* (2013.01)

(58) Field of Classification Search
CPC .............. A01M 7/0089; A01M 21/043; A01M 7/0042; A01M 7/00; A01G 7/06; A01G 7/00; A01G 9/24; A01G 9/26; A01G 31/02; G06T 2207/30188; G06T 2207/10024; G06T 2207/10028; G06T 2207/10048; G06T 2207/10012; G06T 2207/10036;
(Continued)

(56) References Cited

U.S. PATENT DOCUMENTS

| | | | |
|---|---|---|---|
| 1,059,435 A | | 4/1913 | Campbell |
| 2,682,729 A | | 7/1954 | Poynor |

(Continued)

FOREIGN PATENT DOCUMENTS

| | | | |
|---|---|---|---|
| CN | 102506938 A | * | 6/2012 |
| CN | 102166548 B | | 10/2012 |

(Continued)

OTHER PUBLICATIONS

Google patents translation of CN102506938A (Year: 2012).*

(Continued)

*Primary Examiner* — Courtney Joan Nelson
(74) *Attorney, Agent, or Firm* — Fenwick & West LLP

(57) ABSTRACT

A method for plant treatment, including: receiving a first measurement for a plant from a sensor as the sensor moves within a geographic area comprising a plurality of plants; in response to receipt of the first measurement and prior to receipt of a second measurement for a second plant of the plurality, determining a set of treatment mechanism operation parameters for the plant to optimize a geographic area output parameter based on the first measurement and historical measurements for the geographic area; determining an initial treatment parameter for the plant; and operating a treatment mechanism in a treatment mode based on the set of operating parameters in response to satisfaction of the initial treatment parameter.

20 Claims, 13 Drawing Sheets

Related U.S. Application Data continuation of application No. 17/497,866, filed on Oct. 8, 2021, now Pat. No. 11,350,622, which is a continuation of application No. 16/511,866, filed on Jul. 15, 2019, now abandoned, which is a continuation of application No. 14/444,919, filed on Jul. 28, 2014, now Pat. No. 10,390,497.

(60) Provisional application No. 61/859,109, filed on Jul. 26, 2013.

(58) Field of Classification Search
CPC ........... G06T 5/50; G06T 7/0016; G06T 7/55; G06T 7/593; G06T 7/90; G06V 20/188; G06V 10/56; G06V 10/60; G06V 20/38; G06V 20/17; G06V 10/58; G06V 20/56; G06V 20/68; G01N 33/0098; G01N 2021/8466; G01N 21/255; G01N 21/84
See application file for complete search history.

(56) References Cited

U.S. PATENT DOCUMENTS

| | | | |
|---|---|---|---|
| 3,238,667 | A | 3/1966 | Remmert |
| 3,892,357 | A | 7/1975 | Tamny |
| 3,919,806 | A | 11/1975 | Pluenneke et al. |
| 3,967,198 | A | 6/1976 | Gensler |
| 4,004,733 | A | 1/1977 | Law |
| 4,007,794 | A | 2/1977 | Pluenneke et al. |
| 4,015,366 | A | 4/1977 | Hall |
| 4,030,244 | A | 6/1977 | Tennes |
| 4,238,055 | A | 12/1980 | Staar |
| RE31,023 | E | 9/1982 | Hall |
| 4,504,014 | A | 3/1985 | Leuning |
| 4,549,355 | A | 10/1985 | Sauer et al. |
| 4,735,013 | A | 4/1988 | Richardson et al. |
| 4,999,048 | A | 3/1991 | Freepons |
| 5,144,767 | A | 9/1992 | McCloy et al. |
| 5,222,324 | A | 6/1993 | O'Neall et al. |
| 5,296,702 | A | 3/1994 | Beck et al. |
| 5,366,154 | A | 11/1994 | Thompson |
| 5,381,624 | A | 1/1995 | Davis et al. |
| 5,442,552 | A | 8/1995 | Slaughter et al. |
| 5,453,618 | A | 9/1995 | Sutton et al. |
| 5,464,456 | A | 11/1995 | Kertz |
| 5,499,198 | A | 3/1996 | Gaidos et al. |
| 5,507,115 | A | 4/1996 | Nelson |
| 5,585,626 | A | 12/1996 | Beck et al. |
| 5,606,821 | A | 3/1997 | Sadjadi et al. |
| 5,621,460 | A | 4/1997 | Hatlestad et al. |
| 5,653,389 | A | 8/1997 | Henderson et al. |
| 5,661,817 | A | 8/1997 | Hatlestad et al. |
| 5,680,993 | A | 10/1997 | McCracken et al. |
| 5,704,546 | A | 1/1998 | Henderson et al. |
| 5,768,822 | A | 6/1998 | Harrell |
| 5,768,823 | A | 6/1998 | Nelson |
| 5,789,741 | A | 8/1998 | Kinter et al. |
| 5,793,035 | A | 8/1998 | Beck et al. |
| 5,809,440 | A | 9/1998 | Beck et al. |
| 5,837,997 | A | 11/1998 | Beck et al. |
| 5,842,307 | A | 12/1998 | May |
| 5,884,224 | A | 3/1999 | McNabb et al. |
| 5,902,343 | A | 5/1999 | Hale et al. |
| 5,911,668 | A | 6/1999 | Auerbach et al. |
| 5,913,915 | A | 6/1999 | McQuinn |
| 5,924,239 | A | 7/1999 | Rees et al. |
| 6,089,743 | A | 7/2000 | McQuinn |
| 6,160,902 | A | 12/2000 | Dickson et al. |
| 6,199,000 | B1 | 3/2001 | Keller et al. |
| 6,212,824 | B1 | 4/2001 | Orr et al. |
| 6,276,617 | B1 | 8/2001 | Lenhardt |
| 6,336,051 | B1 | 1/2002 | Pangels et al. |
| 6,443,365 | B1 | 9/2002 | Tucker et al. |
| 6,510,367 | B1 | 1/2003 | McQuinn |
| 6,553,299 | B1 | 4/2003 | Keller et al. |
| 6,574,363 | B1 | 6/2003 | Classen et al. |
| 6,671,582 | B1 | 12/2003 | Hanley |
| 6,795,568 | B1 | 9/2004 | Christensen et al. |
| 6,862,083 | B1 | 3/2005 | McConnell et al. |
| 6,907,319 | B2 | 6/2005 | Hoelscher et al. |
| 6,919,959 | B2 | 7/2005 | Masten |
| 6,999,877 | B1 | 2/2006 | Dyer et al. |
| 7,032,369 | B1 | 4/2006 | Eaton et al. |
| 7,081,611 | B2 | 7/2006 | Scott |
| 7,097,113 | B2 | 8/2006 | Ivans |
| 7,188,450 | B2 | 3/2007 | Raun et al. |
| 7,212,670 | B1 | 5/2007 | Rousselle et al. |
| 7,248,968 | B2 | 7/2007 | Reid |
| 7,249,815 | B2 | 7/2007 | Keller et al. |
| 7,263,210 | B2 | 8/2007 | Kümmel |
| 7,313,268 | B2 | 12/2007 | Luo et al. |
| 7,388,662 | B2 | 6/2008 | Cantin et al. |
| 7,408,145 | B2 | 8/2008 | Holland |
| 7,412,330 | B2 | 8/2008 | Spicer et al. |
| 7,570,783 | B2 | 8/2009 | Wei et al. |
| 7,580,549 | B2 | 8/2009 | Wei et al. |
| 7,589,825 | B2 | 9/2009 | Orchard et al. |
| 7,684,916 | B2 | 3/2010 | Wei et al. |
| 7,715,013 | B2 | 5/2010 | Glaser et al. |
| 7,716,905 | B2 | 5/2010 | Wilcox et al. |
| 7,721,515 | B2 | 5/2010 | Pollklas et al. |
| 7,723,660 | B2 | 5/2010 | Holland |
| 7,792,622 | B2 | 9/2010 | Wei et al. |
| 7,848,865 | B2 | 12/2010 | Di Federico et al. |
| 7,876,927 | B2 | 1/2011 | Han et al. |
| 7,877,969 | B2 | 2/2011 | Behnke |
| 7,894,663 | B2 | 2/2011 | Berg et al. |
| 7,904,218 | B2 | 3/2011 | Jochem et al. |
| 7,911,517 | B1 | 3/2011 | Hunt et al. |
| 8,027,770 | B2 | 9/2011 | Poulsen |
| 8,028,470 | B2 | 10/2011 | Anderson |
| 8,160,782 | B2 | 4/2012 | Harrison |
| 8,265,835 | B2 | 9/2012 | Peterson et al. |
| 8,319,165 | B2 | 11/2012 | Holland |
| 8,417,534 | B2 | 4/2013 | Belzer et al. |
| 8,537,360 | B2 | 9/2013 | Stachon et al. |
| 8,924,030 | B2 | 12/2014 | Wendte et al. |
| 9,030,549 | B2 | 5/2015 | Redden |
| 9,076,105 | B2 | 7/2015 | Anderson |
| 9,282,688 | B2 | 3/2016 | Casper et al. |
| 9,609,858 | B2 | 4/2017 | Stowe et al. |
| 9,763,381 | B2 | 9/2017 | Grimm et al. |
| 10,269,107 | B2 | 4/2019 | Jackson et al. |
| 10,548,306 | B2 | 2/2020 | Albert et al. |
| 10,701,852 | B2 | 7/2020 | Calleija et al. |
| 10,973,171 | B2 | 4/2021 | Smith et al. |
| 11,771,077 | B2 | 10/2023 | Fu et al. |
| 2003/0009282 | A1 | 1/2003 | Upadhyaya et al. |
| 2003/0019949 | A1 | 1/2003 | Solie et al. |
| 2004/0045578 | A1 | 3/2004 | Jackson |
| 2004/0149893 | A1 | 8/2004 | Scott |
| 2004/0264762 | A1* | 12/2004 | Mas ........................ G06V 20/10 382/154 |
| 2005/0258360 | A1 | 11/2005 | Whitehouse et al. |
| 2006/0000493 | A1 | 1/2006 | Steger et al. |
| 2006/0213167 | A1 | 9/2006 | Koselka et al. |
| 2006/0265946 | A1 | 11/2006 | Schwager et al. |
| 2007/0044445 | A1 | 3/2007 | Spicer et al. |
| 2008/0095402 | A1 | 4/2008 | Kochi et al. |
| 2008/0141585 | A1 | 6/2008 | Benfey et al. |
| 2008/0253531 | A1 | 10/2008 | Boyden et al. |
| 2009/0114210 | A1* | 5/2009 | Guice ...................... F24S 20/30 126/569 |
| 2009/0210119 | A1 | 8/2009 | Poulsen |
| 2010/0170150 | A1 | 7/2010 | Walsh |
| 2010/0175316 | A1 | 7/2010 | Kubacak |
| 2010/0215222 | A1 | 8/2010 | Zeelen et al. |
| 2010/0307120 | A1 | 12/2010 | Stover |
| 2010/0322477 | A1 | 12/2010 | Schmitt et al. |
| 2011/0167721 | A1 | 7/2011 | Lejeune et al. |
| 2011/0182478 | A1 | 7/2011 | Momesso et al. |
| 2011/0211733 | A1 | 9/2011 | Schwarz |
| 2012/0041916 | A1 | 2/2012 | Jallas |
| 2012/0101784 | A1 | 4/2012 | Lindores et al. |

(56) References Cited

U.S. PATENT DOCUMENTS

| | | | |
|---|---|---|---|
| 2012/0169504 A1 | 7/2012 | Hillger et al. |
| 2012/0205459 A1 | 8/2012 | Bebb et al. |
| 2012/0215729 A1 | 8/2012 | Johnson |
| 2012/0237083 A1 | 9/2012 | Lange et al. |
| 2013/0028487 A1 | 1/2013 | Stager et al. |
| 2013/0238201 A1 | 9/2013 | Redden |
| 2013/0291138 A1 | 10/2013 | Feng et al. |
| 2014/0012732 A1 | 1/2014 | Lindores |
| 2014/0107957 A1 | 4/2014 | Lindores et al. |
| 2014/0180549 A1 | 6/2014 | Siemens et al. |
| 2014/0236381 A1 | 8/2014 | Anderson et al. |
| 2014/0331631 A1 | 11/2014 | Sauder et al. |
| 2016/0255778 A1 | 9/2016 | Redden et al. |
| 2016/0358830 A1 | 12/2016 | Dangler et al. |
| 2017/0251656 A1 | 9/2017 | Kolb et al. |
| 2021/0289702 A1 | 9/2021 | Jung et al. |

FOREIGN PATENT DOCUMENTS

| | | |
|---|---|---|
| CN | 105875030 A | 8/2016 |
| DE | 19523648 A1 | 1/1997 |
| WO | 94/22094 A1 | 9/1994 |
| WO | WO 97/17830 A1 | 5/1997 |
| WO | WO 00/03589 A1 | 1/2000 |
| WO | 2011/115666 A2 | 9/2011 |
| WO | WO 2011/119403 A1 | 9/2011 |
| WO | WO 2012/094116 A1 | 7/2012 |
| WO | WO 2014/101303 A2 | 7/2014 |
| WO | WO 2016/087529 A1 | 6/2016 |
| WO | WO 2017/181127 A1 | 10/2017 |
| WO | WO 2018/073163 A1 | 4/2018 |
| WO | WO 2019/094266 A1 | 5/2019 |
| WO | WO 2019/215582 A1 | 11/2019 |

OTHER PUBLICATIONS

Tong Qingxi, Zhang Xia, Zhang Bing and Wang Jihua, "Crop growth monitoring study by using multi-temporal index image cube analysis," IEEE 2002 International Conference on Communications, Circuits and Systems and West Sino Expositions, Chengdu, China, 2002, pp. 1596-1601 vol. 2 (Year: 2002) doi: 10.1109/ICCCAS.2002.1179083 (Year: 2002).*

PCT International Search Report and Written Opinion for PCT/US2014/048507, Jan. 12, 2015, 11 pages.

United States Office Action, U.S. Appl. No. 14/444,919, Oct. 3, 2018, 11 pages.

United States Office Action, U.S. Appl. No. 14/444,919, Sep. 22, 2017, 8 pages.

United States Office Action, U.S. Appl. No. 14/444,919, Aug. 2, 2017, 9 pages.

United States Office Action, U.S. Appl. No. 14/444,919, Jul. 21, 2016, 10 pages.

United States Office Action, U.S. Appl. No. 14/444,915, Sep. 4, 2019, 33 pages.

United States Office Action, U.S. Appl. No. 16/511,866, Aug. 19, 2021, 12 pages.

United States Office Action, U.S. Appl. No. 17/497,866, Dec. 8, 2021, 14 pages.

Extended European Search Report for European Patent Application No. EP 13757748.2, dated Mar. 9, 2016, 9 Pages.

Final Rejection Mailed on Oct. 7, 2025 for U.S. Appl. No. 18/669,300, 11 page(s).

Non-Final Rejection Mailed on Feb. 25, 2025 for U.S. Appl. No. 18/669,300, 7 page(s).

Office Action for U.S. Appl. No. 14/713,362, Feb. 3, 2017, 12 Pages.

PCT International Search Report and Written Opinion, PCT Application No. PCT/US13/29548, dated May 13, 2013, 11 pages.

United States Office Action, U.S. Appl. No. 13/788,359, Nov. 17, 2014, 22 Pages.

United States Office Action, U.S. Appl. No. 14/444,897, Apr. 2, 2019, six pages.

United States Office Action, U.S. Appl. No. 14/444,905, Apr. 19, 2018, six pages.

United States Office Action, U.S. Appl. No. 14/713,362, Jul. 11, 2016, 22 Pages.

United States Office Action, U.S. Appl. No. 15/665,025, May 2, 2019, 10 pages.

United States Office Action, U.S. Appl. No. 16/720,021, Dec. 22, 2020, 7 pages.

United States Office Action, U.S. Appl. No. 17/348,752, Apr. 5, 2023, 15 pages.

United States Office Action, U.S. Appl. No. 17/348,752, Sep. 21, 2023, 13 pages.

United States Office Action, U.S. Appl. No. 17/348,752, Sep. 30, 2022, 14 pages.

United States Office Action, U.S. Appl. No. 17/497,868, Jun. 13, 2022, 14 pages.

* cited by examiner

SYSTEM AND METHOD FOR PLANT TREATMENT BASED ON NEIGHBORING EFFECTS

CROSS-REFERENCE TO RELATED APPLICATIONS

This application is a continuation of U.S. patent application Ser. No. 17/749,113, filed May 19, 2022, (now U.S. Pat. No. 11,974,562) which is a continuation of U.S. patent application Ser. No. 17/497,866, filed Oct. 8, 2021 (now U.S. Pat. No. 11,350,622) which is a continuation of U.S. patent application Ser. No. 16/511,866 filed on Jul. 15, 2019, now abandoned, which is a continuation of U.S. patent application Ser. No. 14/444,919 filed on Jul. 28, 2014, (now U.S. Pat. No. 10,390,497 issued on Aug. 27, 2019), which claims benefit of provisional of U.S. Patent Application Ser. No. 61/859,109, filed on Jul. 26, 2013, all of these applications are hereby incorporated by reference.

This application is related to U.S. application Ser. No. 13/788,320 filed Mar. 7, 2013, which is incorporated in its entirety by this reference.

TECHNICAL FIELD

This invention relates generally to the agricultural field, and more specifically to a new and useful automated system and method of treatment selection and application in the agricultural field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

Figure 1:
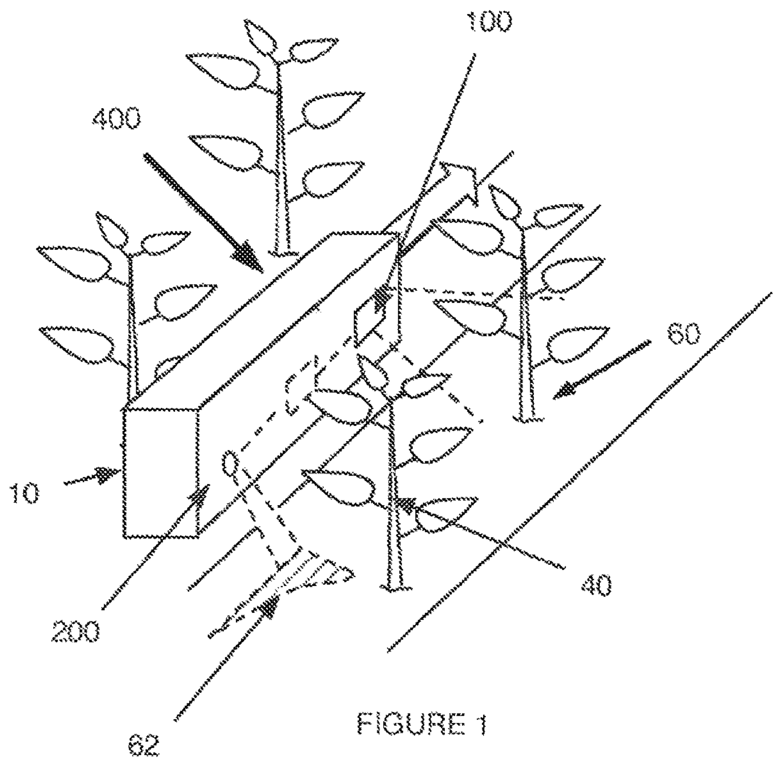
FIG. 1 is a schematic representation of a plant treatment system operating within a geographic area including a plurality of plants.

As shown in FIG. 1, the system 10 for plant treatment includes a detection mechanism 100, a treatment mechanism 200, and a control system. The system 10 can additionally include a mounting mechanism 400, a verification mechanism, a power source, digital memory, communication apparatus, or any other suitable component.

The system 10 functions to apply a treatment to one or multiple plants within the geographic area. The treatment preferably functions to regulate plant growth. The treatment is preferably directly applied to a single plant (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate S110, incinerating a portion of the plant, applying a necrosing concentration of working fluid (e.g., fertilizer, hormone, water, etc.) to the plant, or necrosing the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants are preferably crops, but can alternatively be weeds or any other suitable plant. The crop is preferably corn, but can alternatively be lettuce, soy beans, rice, carrots, tomatoes, broccoli, cabbage, potatoes, wheat or any other suitable commercial crop. The plant field in which the method is used is preferably an outdoor plant field, but can alternatively be plants within a greenhouse, a laboratory, a grow house, a set of containers, a machine, or any other suitable environment. The plants are preferably grown in one or more plant rows (e.g., plant beds), wherein the plant rows are preferably substantially parallel, but can alternatively be grown in a set of plant pots, wherein the plant pots can be ordered into rows or matrices or be randomly distributed, or be grown in any other suitable configuration. The crop rows are preferably spaced between 2 inches to 45 inches apart (e.g. as determined from the longitudinal row axis), but can alternatively be spaced any suitable distance apart. The plants within each plant field, plant row, or plant field subdivision preferably includes the same type of crop (e.g. same genus, same species, etc.), but can alternatively include multiple crops (e.g., a first and a second crop), both of which are to be analyzed. Each plant preferably includes a stem, arranged superior (e.g., above) the substrate 70, which supports the branches, leaves, and fruits of the plant. Each plant can additionally include a root system joined to the stem, located inferior the substrate plane (e.g., below ground), that supports the plant position and absorbs nutrients and water from the substrate 70. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 70 is preferably soil, but can alternatively be a sponge or any other suitable substrate.

Figure 3:
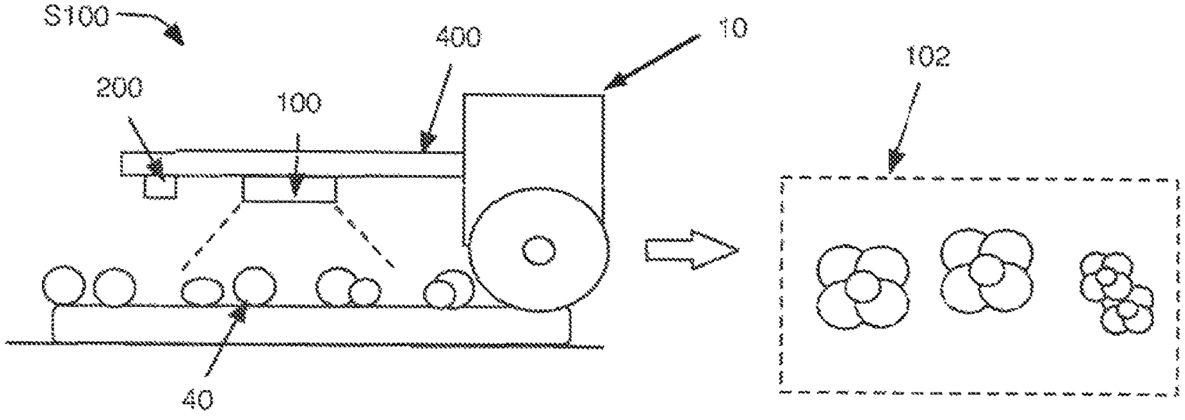
FIGS. 3, 4, and 5 are a schematic representation of a first, second, and third variation of the plant treatment system, respectively, and a measurement captured by the detection mechanism of the respective plant treatment system.
Figure 4:
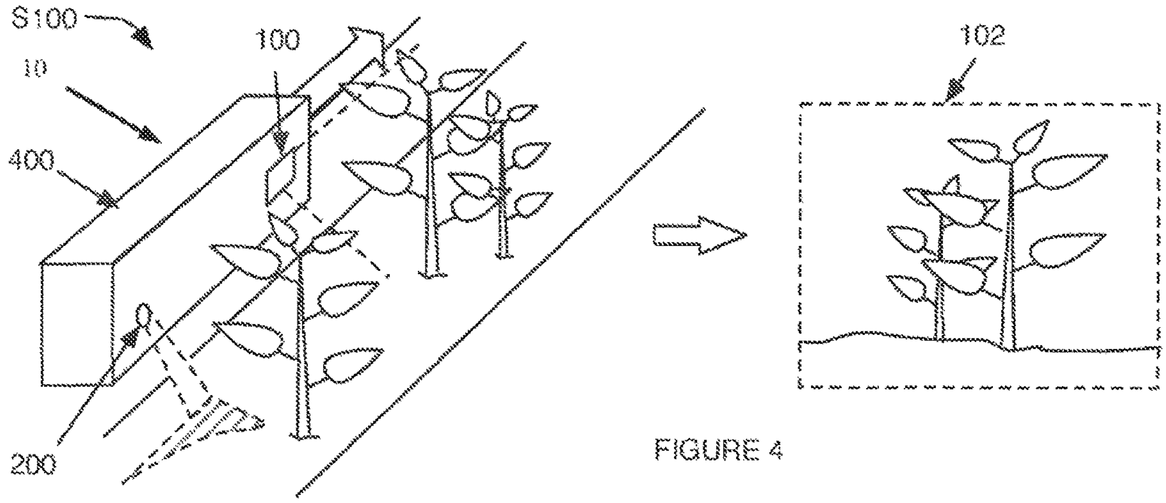
Figure 5:
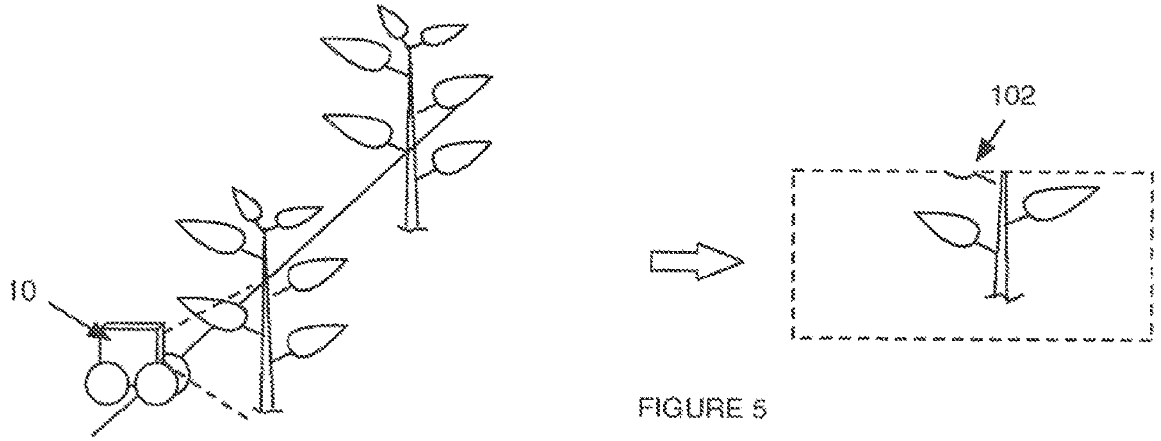

The system 10 can additionally function to traverse through a geographic area, such as a field. The system 10 is preferably a ground-based system, but can alternatively be an airborne system or any other suitable system. The system 10 can be configured (e.g., be sized) to span at least a first and a second crop furrow (e.g., encompass a crop row), as shown in FIG. 3; be configured to translate along a single furrow, as shown in FIG. 4; be configured to translate between stems of adjacent plants (e.g., sized on the order of several inches), as shown in FIG. 5; be configured to encompass an entire or substantial portion of a crop field, or have any other suitable dimension. The system 10 is preferably a passive system, and removably or permanently mounts to a driving mechanism, such as a tractor, that applies a driving force (e.g., a pulling or pushing force) to translate the system within the geographic area. Alternatively, the system can be an active system, and translate within the geographic area automatically or in response to receipt to driving instructions.

The system 10 can additionally function to automatically identify a plant within the geographic area. The system 10 preferably identifies the plant based on measurements from the detection mechanism 100, but can alternatively identify the plant in any other suitable manner. The plant is preferably identified (uniquely or generically) based on a plant identifier, wherein information associated with the plant can be retrieved based on the plant identifier, but the plant can alternatively be generically identified or otherwise identified. The plant identifier can be a geographic location (e.g., set of geographic coordinates, location relative to a predetermined location, etc.), a pattern of plant features (e.g., stomatal pattern, etc.), a growth or necrosis pattern of secondary plants adjacent the plant 40, a unique marker adjacent the plant, or any other suitable unique identifier.

The system 10 can additionally function to determine a treatment for a plant. The system 10 preferably individually determines a treatment for each individual plant, but can alternatively determine a treatment for multiple adjacent plants, multiple plants within the geographic area, or determine a treatment for any other suitable set of plants. The system 10 can additionally select a treatment mechanism 200 from a plurality of treatment mechanisms and/or determine a set of operation parameters for the treatment mechanism 200 based on the determined treatment.

The treatment is preferably determined to optimize an output parameter for the geographic area (geographic area output parameter). Geographic area output parameter optimization can include minimizing or maximizing the geographic area output parameter, or otherwise optimizing the geographic area output parameter. The geographic area output parameter can include plant or crop yield (e.g., crop yield, agronomical output, or crop per unit area of geographic area or land cultivation, etc.), color, size, compound concentration (e.g., sugar concentration), compound quantity (e.g., sugar quantity), uniformity (e.g., inter-plant spacing, plant size, etc.), crop concentration per plant, input cost (e.g., minimize input cost), risk (e.g., minimize input risk), or any other suitable geographic area output parameter. The crop can include the fruit, leaves, stems, roots, entirety, or any other suitable portion of a plant. In one variation of the method, optimizing the geographic area output parameter includes maximizing crop yield for the geographic area (e.g., field or section thereof). In another variation of the method, optimizing the geographic area output parameter includes minimizing the number of weeds within the geographic area (e.g., field or section thereof). In one example of the method, treatments are applied to plants to speed up or slow down the plant's development, such that the plant ripens at substantially the same time as the majority of similar plants within the geographic area (e.g., within a margin of error of several minutes, hours, days, weeks, or months).

The treatment can additionally or alternatively be determined to optimize an output parameter for a plant or crop. Plant output parameters can include measures of plant health (e.g., visual parameters, such as an amount of green light reflected by the plant or a ratio of green to brown light reflected by the plant, haptic parameters, such as turgidity, audio parameters, such as ultrasound measurements, dimension measurements, etc.), plant yield (e.g., the fruit concentration on the plant), plant color, plant composition, plant balance (e.g., plant lean toward one side), or any other suitable plant parameter.

The treatment can additionally or alternatively be determined based on historical measurements for the geographical area. The historical measurements can include historical treatments on the plant, historical treatments on secondary plants associated with the plant by an ambient environment feature (e.g., landform, wind, soil conductivity, temperature, humidity, etc.), historical ambient environment parameters (e.g., amount of sunlight, amount of waterfall, amount of wind, etc.), or any other suitable historical measurements. The treatment can alternatively or additionally be determined based on classifiers, machine learning outputs, or any other suitable parameter determined from historical measurements.

The treatment can additionally or alternatively be determined based on anticipated measurements for the geographical area. Anticipated measurements can include forecasted weather (e.g., light, wind, rain, electricity, etc.), forecasted treatments to secondary plants 50 within the geographic area, forecasted treatments to tertiary plants within a second geographic area different from the first geographic area, or any other suitable anticipated measurements. Anticipated measurements can additionally include anticipated effects of previous treatments on previously treated plants 20. However, the treatment can be selected based on any other suitable anticipated measurement, or any other suitable output parameter associated with the crop, plant, or geographic area.

The detection mechanism 100 of the plant treatment system 10 functions to record a measurement 102 of the ambient environment of the system 10, more preferably a measurement of the geographic area, even more preferably a measurement of a plant within the geographic area. The plant is preferably identified based on the measurement 102 (first measurement). The detection mechanism 100 is preferably configured to record the measurements during system movement or traversal within the geographic area, but can alternatively or alternatively record the measurements when the system is static within the geographic area. The detection mechanism 100 preferably sends the measurement to the control system for processing and subsequent plant identification, but can alternatively process the measurement to identify the plant itself.

Figure 6A:
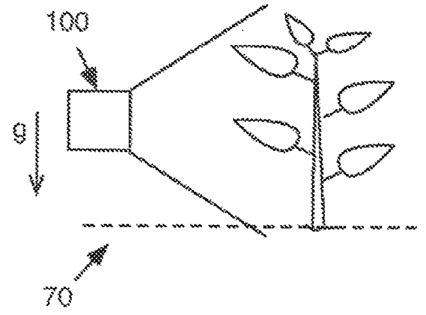
FIGS. 6A, 6B, and 6C are schematic representations of a first, second, and third detection mechanism orientation relative to a plant, substrate plane and/or gravity vector.
Figure 6B:
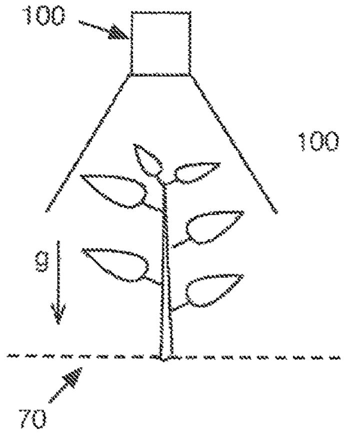
Figure 6C:
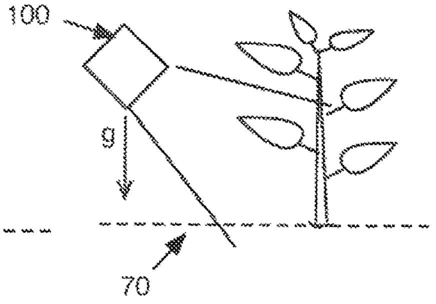

The detection mechanism 100 preferably includes a measurement area, such as a field of view or any other suitable measurement area. The detection mechanism 100 can be an optical sensor (e.g., a spectral imaging system), acoustic sensor, haptic sensor, electromagnetic sensor, or any other suitable sensor. The system 10 can include one or more detection mechanisms. The measurement can be a single image, a set of images, a force change, a resistivity change, an audio pattern, an object profile, a geographic location (e.g., set of coordinates), or any other suitable measurement. The detection mechanism 100 is preferably arranged with the measurement area oriented at an angle relative to the gravity vector or the substrate plane, such that the measurement includes both the substrate plane and all or a portion of the plant. However, the measurement can alternatively only include the plant, the substrate plane, or any other suitable vector. In a first variation, as shown in FIG. 6A, the detection mechanism measurement area includes a vector parallel to the substrate surface (e.g., such that the detection mechanism 100 is oriented horizontally and/or measures a side of the plant). In a second variation, as shown in FIG. 6B, the detection mechanism measurement area includes a vector parallel to a gravity vector (e.g., such that the detection mechanism 100 is oriented above the plant and/or measures the top of the plant or a length of the plant). In a third variation, as shown in FIG. 6C, the detection mechanism measurement area includes a vector at an angle between a plane of the substrate surface and a gravity vector (e.g., such that the detection mechanism 100 measures both a portion of the plant and a portion of the substrate 70). However, the detection mechanism 100 can be otherwise angled. The detection mechanism angle is preferably fixed, but can alternatively be adjustable. The detection mechanism 100 can be arranged at a fixed height or distance from the substrate 70 (e.g., within a foot of the substrate, within three feet of the substrate, within ten feet of the substrate, etc.), or can have an adjustable height.

In a first variation, the detection mechanism 100 includes a stereocamera Or plenoptic camera that records a stereoview (e.g., an image formed from a first and second image). The stereocamera can include a first and second lens, a first and second optical sensor (e.g., CCD), or be any other suitable stereocamera. The stereocamera is preferably arranged such that the alignment axis of the first and second images is substantially parallel the substrate plane or rotational axes alignment axis of a first and second system wheel 11, but can alternatively be arranged such that the alignment axis of the first and second images is arranged within a plane substantially parallel the substrate plane or perpendicular a gravity vector. However, the stereocamera can be otherwise arranged.

In a second variation, the detection mechanism 100 includes a multispectral camera that captures image data at specific frequencies across the electromagnetic spectrum. The wavelengths can be separated by filters, recorded by sensors that are sensitive to specific wavelengths, or otherwise specifically identified. The multispectral camera can capture images at a single wavelength or multiple wavelengths. The wavelengths can include wavelengths between 515 to 600 nm (green), 450 to 520 nm (blue), 600 to 690 nm (red), 750-900 nm (near infrared), 1550-1750 nm (mid-infrared, e.g., to further identify soil moisture content, etc.), 2080-2350 nm (mid-infrared, e.g., to image soil, moisture, geographical features, etc.), 10400-12500 nm (thermal infrared), or any other suitable wavelength. The spectral band usage can be true-color, green-red-infrared, blue-NIR-MIR, or any other suitable combination. The electromagnetic waves can be ambient electromagnetic waves (e.g., provided by a star, such as the sun), but can alternatively be provided by any other suitable electromagnetic wave source.

However, the detection mechanism 100 can be a CCD camera, single lens camera, monocular camera, projected light imaging system, projected pattern imaging system, scanning imaging system, time-of-flight system, hyperspectral imaging system, LIDAR system (light detection and ranging system), dyanmometer, IR camera, thermal camera, geographic location sensor (e.g., a GPS system, cellular tower triangulation system, etc.), or any other suitable detection mechanism 100 capable of recording a measurement from which a plant can be identified. The detection mechanism 100 can additionally or alternatively include an ambient environment sensor, such as a light sensor, temperature sensor, humidity sensor, wind speed sensor, or any other suitable sensor.

The detection mechanism 100 can additionally include a signal emitter that functions to provide a signal, wherein the reflectance of the signal is captured by the detection mechanism 100. The emitter can be light having a set of electromagnetic wavelengths, an array of lights (e.g., a grid of lasers), sound having a set of acoustic wavelengths, or emit any other suitable signal. The emitter is preferably statically mounted relative to a detection mechanism mounting point, but can alternatively be mobile relative to the detection mechanism mounting point.

The detection mechanism 100 can additionally include a shield that functions to block ambient environmental signals from interfering with the detection mechanism measurement. For example, the shield can be a sun shield that functions to block sunlight from the plant during detection mechanism measurement. The shield can be an EMI shield, a light shield, an acoustic shield, a wind shield, or a shield for any other suitable ambient environment feature. The shield is preferably used with a system including an emitter, but can alternatively be used independent of systems including emitters. The shield can additionally or alternatively block ambient environment forces or substances from the treatment area (e.g., form a controlled environment about the plant). For example, the shield can block wind from the volume surrounding the plant to be treated.

The treatment mechanism 200 of the system 10 functions to apply a treatment to the identified plant. The treatment mechanism 200 preferably includes an active area 201 to which the treatment mechanism 200 applies the treatment. The effect of the treatment can include plant necrosis, plant growth stimulation, plant portion necrosis or removal, plant portion growth stimulation, or any other suitable treatment effect. The treatment can include plant dislodgement from the substrate 70, severing the plant (e.g., cutting), plant incineration, electrical stimulation of the plant, fertilizer or growth hormone application to the plant, watering the plant, light or other radiation application to the plant, injecting one or more working fluids into the substrate 70 adjacent the plant (e.g., within a threshold distance from the plant), or otherwise treating the plant. The treatment mechanism 200 is preferably operable between a standby mode, wherein the treatment mechanism 200 does not apply a treatment, and a treatment mode, wherein the treatment mechanism 200 is controlled to apply the treatment. However, the treatment mechanism 200 can be operable in any other suitable number of operation modes.

The system 10 can include a single treatment mechanism 200, or can include multiple treatment mechanisms. The multiple treatment mechanisms can be the same type of treatment mechanism, or be different types of treatment mechanisms. The treatment mechanism 200 can be fixed (e.g., statically coupled) to the mounting mechanism 400 or relative to the detection mechanism 100, or actuate relative to the mounting mechanism 400 or detection mechanism 100. For example, the treatment mechanism 200 can rotate or translate relative to the detection mechanism 100 and/or mounting mechanism 400. In one variation, the system 10 includes an array of treatment mechanisms, wherein a treatment mechanism 200 of the array is selected to apply the treatment to the identified plant in response to identification of the plant and the plant position relative to the array. In a second variation, the system 10 includes a single treatment mechanism, wherein the treatment mechanism is actuated or the system 10 moved to align the treatment mechanism active area with the targeted plant segment.

Figure 7:
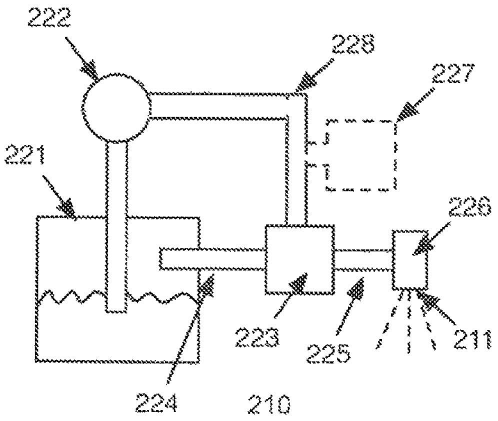
FIG. 7 is a schematic representation of a variation of a spray mechanism, wherein the spray mechanism can optionally include a secondary reservoir.

In a first variation, as shown in FIG. 7, the treatment mechanism 200 can include a spray mechanism, more preferably a high pressure spray mechanism, wherein the active area includes a spray area. The high pressure spray mechanism preferably functions to spray a high pressure jet or spray to dislodge the plant from the substrate, but can alternatively or additionally function to apply a force (e.g., a cutting force) to an portion of the plant (e.g., plant stem, leaf, branch, root, or any other suitable plant portion) or substrate, or function to treat the plant in any other suitable manner. The high pressure spray mechanism preferably does not spray working fluid in the standby mode, and sprays a working fluid, more preferably a working liquid, in the treatment mode. The working fluid can be water, fertilizer, growth hormone, or any other suitable fluid. The working fluid is preferably emitted (e.g., sprayed) at a spray pressure of approximately 1,200 psi, within a margin of error (e.g., a 5% margin of error, 2% margin of error, etc.), but can alternatively be emitted at a pressure between 900 psi and 3,200 psi, or at any other suitable pressure. The nozzle is preferably positioned within several centimeters (e.g., 1 cm, 5 cm, 10 cm, etc.) of the substrate surface, but can alternatively be positioned a meter away from the substrate surface, 10 meters away from the substrate surface, or positioned any suitable distance away from the substrate surface. The high pressure spray mechanism preferably sprays working fluid at 1,500 psi, but can alternatively spray working fluid at 500 psi, 10 psi, 3,000 psi, or any other suitable pressure.

Figure 8:
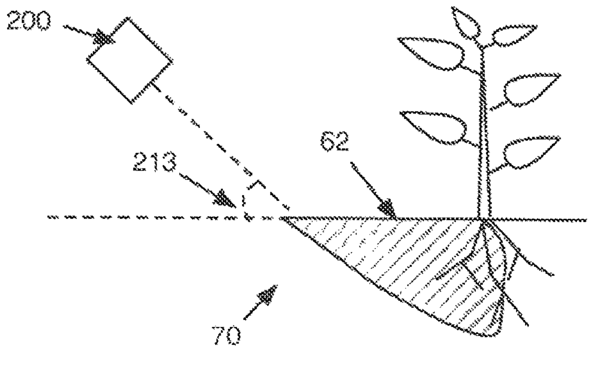
FIG. 8 is a schematic representation of a high-pressure spray mechanism operating in the treatment mode.
Figure 10A:
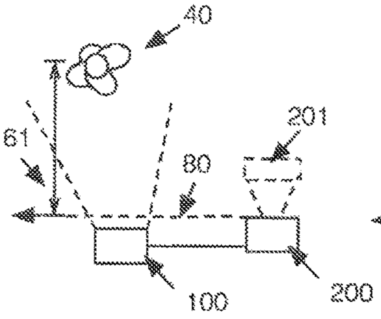
FIGS. 10A, 10B, and 10C are schematic representations of a system, including a high-pressure spray dislodgement mechanism: identifying a plant and junction distance, operating high-pressure spray dislodgement mechanism in the treatment mode at an initial spray position, and adjusting the spray pattern as a function of nozzle proximity to the junction distance, respectively.
Figure 10B:
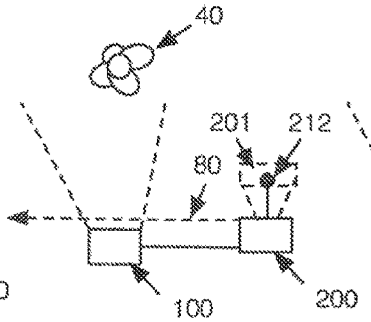
Figure 10C:
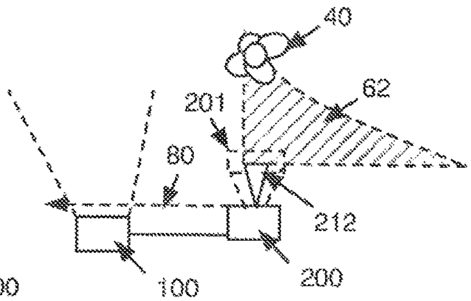

The high pressure spray mechanism preferably includes a nozzle 211. The nozzle 211 is preferably oriented at a 20 degree angle relative to the substrate plane, but can alternatively be oriented at a 45 degree angle, 30 degree angle, 90 degree angle (e.g., pointing straight down at the substrate plane), or any other suitable angle 213 relative to the substrate plane, as shown in FIG. 8. The nozzle 211 can alternatively be actuatable relative to the mounting mechanism or detection mechanism. The nozzle 211 is preferably operable between a first and second mode that results in a first and second spray pattern 212, respectively, in the treatment mode, as shown in FIGS. 10A, 10B, and 10C. However, the nozzle 211 can be operable in any suitable number of modes. The first spray pattern preferably functions to create an initial crack in the substrate 70, while the second spray pattern functions to remove wide swaths of substrate 70. The first spray pattern is preferably a solid stream (e.g., solid cone), but can alternatively be a hollow cone, full cone, or any other suitable spray pattern capable of providing a high impact per unit area. The second spray pattern is preferably a flat spray pattern (e.g., a flat fan), capable of covering a larger area than the first spray pattern. Nozzle operation preferably smoothly transitions from the first spray pattern to the second spray pattern, but can alternatively transition from the first spray pattern to the second spray pattern in a stepwise manner (e.g., suddenly transition from the first spray pattern to the second spray pattern). Alternatively, the first and second spray patterns can each be created by a first and second nozzle, respectively. The nozzle 211 is preferably a single-fluid nozzle, but can alternatively be a multiple-fluid nozzle. The nozzle 211 can be a plain-orifice nozzle, a shaped-orifice nozzle, a surface-impingement single-fluid nozzle, a pressure-swirl single-fluid spray nozzle, a solid-cone single-fluid nozzle, a compound nozzle, an internal mix two-fluid nozzle, external-mix two-fluid nozzle, or any other suitable nozzle. The nozzle 211 can have a fixed aperture or an actuatable aperture. Nozzle emission (e.g., nozzle spray) is preferably controlled by a solenoid 226, but can alternatively be controlled by a valve or any other suitable control mechanism. The solenoid 226 preferably controls the nozzle to open (e.g., spray) in response to receipt of a spray command from the control system, but can alternatively be passively or mechanically controlled.

The high pressure spray mechanism can additionally include a pressurization system 220, including a reservoir 221 and a pump 222. The high pressure spray mechanism can additionally include a bypass valve 223 fluidly connecting an inlet manifold 228 fluidly connected to the reservoir 221, a first outlet manifold 224 fluidly connected to the reservoir 221, and a second outlet manifold 225 fluidly connected to the nozzle 211. The bypass valve 223 is preferably operable between a closed mode, wherein the bypass valve 223 fluidly disconnects the nozzle 211 from the reservoir 221, and an open mode, wherein the bypass valve 223 fluidly connects the nozzle 211 to the reservoir 221, more preferably fluidly connects the inlet manifold with the nozzle 211. The bypass valve 223 can be passive, wherein the cracking pressure is substantially the same as the desired spray pressure, or can be active, wherein bypass valve actuation from the closed to open mode is actively controlled, such as by the control system. The bypass valve 223 can fluidly disconnect (e.g., seal) the inlet manifold from the first outlet manifold 224, or fluidly connect all three fluid manifolds. The pump 222 preferably pressurizes the reservoir 221 to the spray pressure by pumping the working fluid into the inlet manifold, through the bypass valve 223, and through the first outlet manifold 224 into the reservoir 221. The pump 222 can pressurize the reservoir 221 with secondary fluid from the ambient environment (e.g., from a fluid source or air), or pressurize the working fluid in the reservoir 221 in any other suitable manner. The bypass valve 223 preferably opens in response to the inlet manifold fluid pressure substantially meeting or exceeding the desired spray pressure, such that the inlet manifold is fluidly connected to the nozzle 211. In this variation, the treatment mechanism 200 can additionally include a pressure sensor or flow sensor that measures the fluid pressure or flowrate at the nozzle 211, inlet manifold, bypass valve 223, first outlet manifold 224, second outlet manifold 225, or reservoir 221, wherein the treatment parameters (e.g., initial spray time or position) can be subsequently adjusted or determined based on the measured working fluid parameters.

The high pressure spray mechanism can additionally or alternatively include a secondary reservoir 227 (e.g., accumulator) fluidly connected to the first reservoir 221 and the nozzle 211, wherein the pump 222 pumps working fluid from the reservoir 221 to the accumulator 227. The accumulator 227 functions to retain a volume of working fluid sufficient to spray a predetermined number of plants. The accumulator 227 can additionally function to pressurize the fluid. The accumulator 227 preferably fluidly connected to the reservoir 221 between the pump 222 and the nozzle 211. The high pressure spray mechanism can additionally include a valve that controls fluid flow between the accumulator 227 and the nozzle 211. When a bypass valve 223 is used, as in the variant described above, the accumulator 227 is preferably fluidly connected to the inlet manifold between the pump 222 and the valve 223. The accumulator 227 is preferably connected in parallel with the nozzle 211, but can alternatively be connected in series with the nozzle 211. The accumulator 227 can be additionally fluidly connected to a secondary working fluid reservoir, wherein metered amounts of secondary working fluid (e.g., fertilizer, growth hormone, etc.) can be provided to the accumulator 227 to mix with the primary working fluid (e.g., water) within the accumulator 227. However, the high pressure spray mechanism can include any other suitable components.

In a second variation, the treatment mechanism 200 can include an electrical discharge mechanism, which functions to apply electric discharge 245 to a plant. The electric discharge can stimulate the plant, cauterize (e.g., necrose, incinerate) the plant, or otherwise treat the plant. The electric discharge preferably has a high voltage (e.g., large potential) and a large current, but can alternatively have a high voltage and low current, low voltage and high current, or have any other suitable electrical parameters. The electric discharge parameters are preferably set, but can alternatively be adjustable (e.g., based on the system traversal velocity, ambient environment electrical conductivity, etc.). The electrical discharge voltage is preferably approximately 50,000V (e.g., within a margin of error, such as 5% error, 2% error, etc.), but can alternatively be between 10,000 V and 100,000 V, or have any other suitable value. The electric discharge power is preferably related to the size of the plant, but can alternatively be related to any other suitable plant parameter. The electric discharge can be an electrostatic discharge (e.g., plasma discharge), corona discharge, dielectric barrier discharge, brush discharge, electric arc, leader, partial discharge, electric glow discharge, or any other suitable electrical discharge. The electric discharge mechanism is preferably actuatable relative to the mounting mechanism 400 or detection mechanism 100, such that the electric discharge can be applied to a specific portion of the plant, but can alternatively be static relative to the mounting mechanism 400 or detection mechanism 100.

Figure 11A:
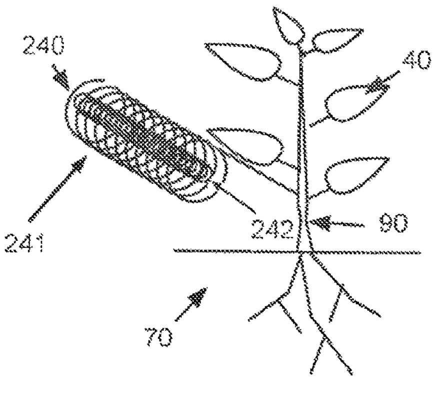
FIGS. 11A and 11B are schematic representations of a first variation of an electric discharge mechanism applying electric discharge to a plant and a resultant cauterized plant section, respectively.
Figure 11B:
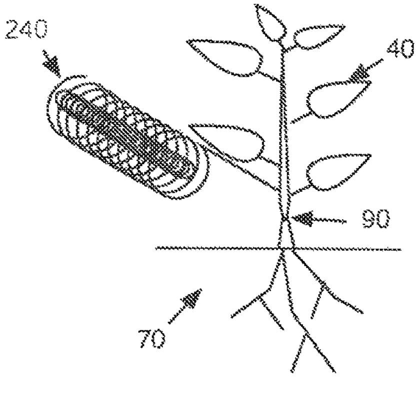
Figure 12:
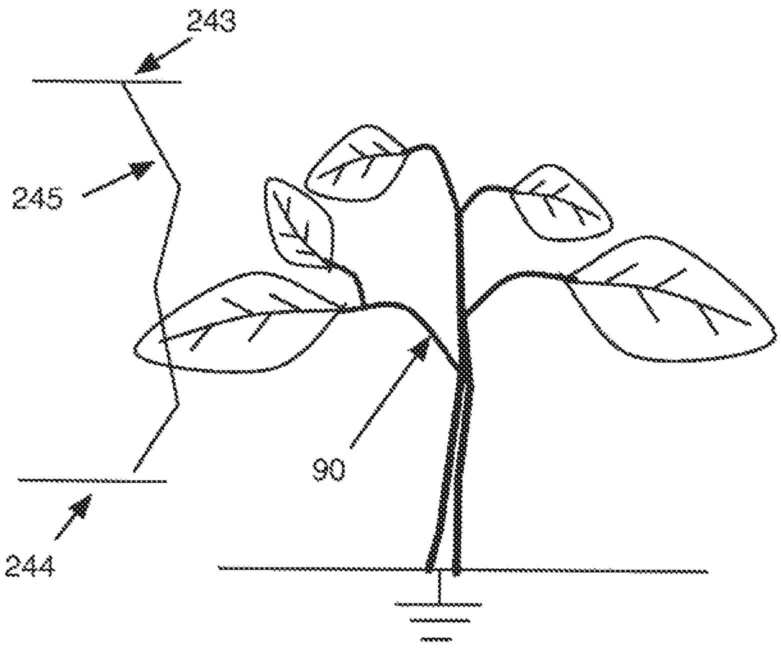
FIG. 12 is a schematic representation of a second variation of an electric discharge mechanism applying electric discharge to a plant.

The electrical discharge mechanism is preferably a Tesla coil 240, but can alternatively be a corona discharge mechanism, dielectric barrier discharge mechanism, or any other suitable discharge mechanism. As shown in FIGS. 11A and 11B, the Tesla coil 240 preferably includes a primary coil 241 extending in parallel with a longitudinal axis of a secondary coil 242, wherein the primary coil 241 encircles the secondary coil 242. The secondary coil 242 preferably functions as electrical ground, while the primary coil 241 is held at an elevated voltage, such that a potential difference is maintained between the primary and secondary coils. The primary and secondary coils are preferably concentric, but can alternatively be coaxial, offset, or arranged in any other suitable configuration. The primary and secondary coils are preferably electrically connected together in parallel, but can alternatively be electrically connected in series. However, the Tesla coil 240 can include any suitable number of coils electrically connected in parallel, in series, or a combination thereof. The Tesla coil 240 can additionally include a conducting wire electrically connected to the primary and/or secondary coil that functions to direct the electrical discharge. The conducting wire is preferably flexible, such that a linear segment of the plant (e.g., selected for electric discharge application) is capable of contacting a linear segment of the conducting wire, but can alternatively be substantially rigid, such that a segment of the plant contacts a point of, a small segment of, or does not contact the conducting wire, or such that the conducting wire is capable of mechanically penetrating a portion of the stem or branch. Alternatively, as shown in FIG. 12, the electric discharge mechanism can include a first electrode 243 and second electrode 244 biased at different electrical potentials, or include any other suitable electric discharge mechanism.

Figure 13A:
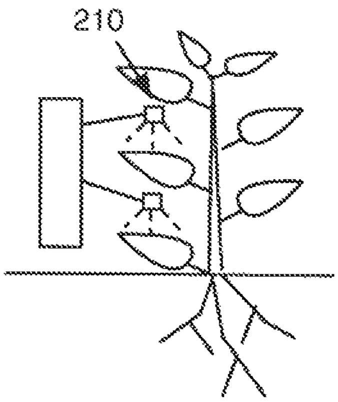
FIGS. 13A, 13B, and 13C are schematic representations of low-pressure spray mechanism treatment of a plant in a first, second, and third orientation, respectively.
Figure 13B:
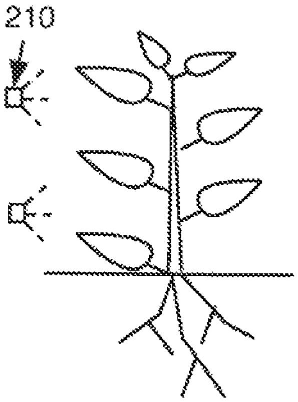
Figure 13C:
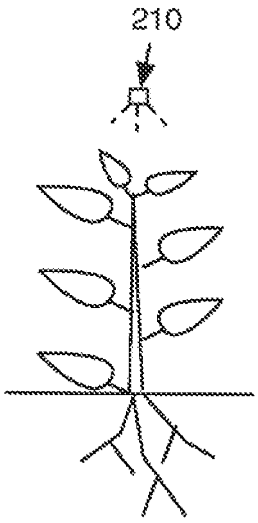

In a third variation, the treatment mechanism 200 can include a low pressure spray mechanism 210 that functions to apply a working fluid to the plant. The application is preferably mechanically non-destructive, but can alternatively be destructive. The working fluid is preferably applied to the top-facing leaves of the plant (as shown in FIG. 13A), but can alternatively be applied to any plant structure superior (e.g., above) the substrate 70, such as the side of the plant (as shown in FIG. 13B), the top of the plant (as shown in FIG. 13C), or any other suitable structure. The working fluid is preferably one or more growth hormones, but can alternatively be fertilizer, water, insecticide, fungicide, barbicide, dessicants, defoliants, plant growth regulators, or any other suitable working fluid. The working fluid can be liquid, solid, gas, liquid with suspended particulates, or have any other suitable composition. The low pressure spray mechanism 210 preferably generates a mist of the working fluid (e.g., an atomized spray or aerosol of the working fluid), but can alternatively generate droplets of any suitable size to mist, spray, or otherwise apply the working fluid to the plant. The low pressure spray mechanism 210 preferably includes a nozzle 211, a reservoir 221, and a pump 222. The low pressure spray mechanism 210 can be substantially similar to the high pressure spray mechanism, or can be substantially different. The nozzle 211 of the low pressure spray mechanism 210 can be rotary atomizer, ultrasonic atomizer, vibrating orifice aerosol generator, aerosol spray, electrospray, any of the nozzles described for the high pressure spray mechanism, or any other suitable aerosol-generating mechanism. The low pressure spray mechanism 210 can additionally include a fan or other carrying fluid movement mechanism that functions to bias the droplets toward the target plant, wherein the carrying fluid is preferably air, but can alternatively be wind, water, or any other suitable ambient fluid. Alternatively, the system 10 can include an ambient wind monitoring sensor, wherein nozzles upstream of the targeted plant portion are actuated to dispense the working fluid to the targeted plant portion. The low pressure spray mechanism 210 can apply the working fluid at a low pressure (e.g., less than 1 psi), between 5-10 psi, between 5-25 psi, or at any other suitable pressure.

The droplets emitted by the low pressure spray mechanism 210 can be uncharged or charged, such that the droplets are attracted to the plant. The droplets are preferably charged to a single polarity (e.g., such that only positively or negatively charged droplets are emitted), but can alternatively be charged to with both positive and negative charges. The droplets are preferably charged by a charging mechanism, such as an electrode (e.g., a rail electrode, a circular electrode, a point electrode, etc.). The charging mechanism preferably functions to generate a charging field proximal the low pressure spray mechanism orifice, more preferably at a point external the low pressure spray mechanism but alternatively at a point internal the low pressure spray mechanism 210. The charging mechanism can charge the droplets as the droplets are formed, before the droplets are formed, or after the droplets are formed. The charging mechanism can be located within the low pressure spray mechanism orifice (e.g., aligned with the orifice central axis, etc.), encircle the low pressure spray mechanism orifice, be offset from the low pressure spray mechanism orifice (e.g., located in a separate plane than that of the orifice), be arranged adjacent and external the orifice, or be arranged in any other suitable configuration. However, the droplets can be otherwise charged. In variants in which droplets of a single polarity are emitted, the low pressure spray mechanism 210 can additionally include an electrical connection that electrically connects the charging mechanism to the plant, such that the plant forms a portion of a circuit (e.g., functions as the electrical ground or is charged to the polarity opposing that of the droplets, thereby attracting the charged droplets).

The control system of the system 10 functions to control treatment mechanism operation. The control system can additionally function to select the treatment mechanism operation parameters. The control system can additionally function to process the detection and/or verification mechanism measurements to extract plant parameters, such as the plant distance from the detection mechanism 100, the plant size, the plant profile, the plant junction 60 with the substrate 70, the plant color, the plant orientation, the plant electrical conductivity, the plant composition, the plant emissions (e.g., volatile organic compound emissions), the plant nutrient status, the presence or absence of disease symptoms, the presence, absence and/or quantification of pests (e.g. insects), any other suitable plant parameter indicative of plant health, or any other suitable plant parameter. The control system can additionally function to process the detection mechanism measurements to extract ambient environment parameters, such as incident light (e.g., wherein the detection mechanism 100 is a light sensor), wind speed, temperature, humidity, soil conductivity, or any other suitable ambient environmental parameter. The control system can additionally function to communicate (e.g., send and/or receive data to and/or from) a remote computing device, such as a mobile device, server system, or any other suitable device. The control system is preferably a computing system including one or more PCBs, but can alternatively be any other suitable control system. The control system is preferably electrically connected to the detection mechanism 100 and/or verification mechanism 500, wherein the control system receives measurements from the detection mechanism 100 and/or verification mechanism 500. The control system can additionally send control information (e.g., focusing information, filtering information, actuation information, etc.) to the detection and/or verification mechanism. The control system is preferably electrically connected to the treatment mechanism 200, wherein the control system can send control information to the treatment mechanism 200. The control system can additionally receive the actual treatment mechanism operation parameters from the treatment mechanism 200 concurrently or after treatment mechanism operation. However, the control system can control and/or receive information from any other suitable system component.

The control system can additionally include digital memory, which functions to transiently or permanently retain settings, measurements, or any other suitable data. The digital memory is preferably flash memory, but can alternatively or additionally be RAM or any other suitable memory.

Figure 2A:
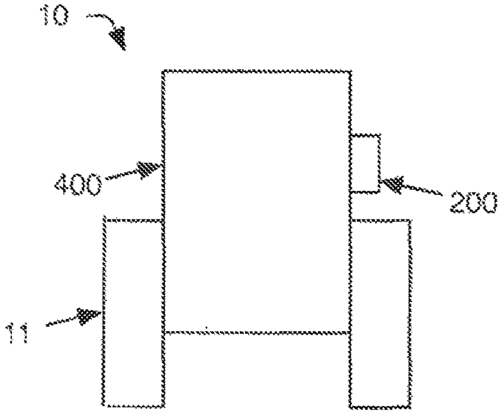
FIGS. 2A and 2B are end and side views of a variation of the plant treatment system.
Figure 2B:
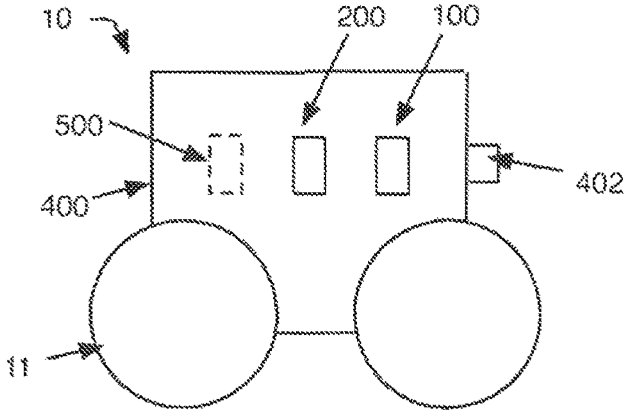

The system 10 can additionally include a mounting mechanism 400 that functions to provide a mounting point for the system components. In one example, as shown in FIGS. 2A and 2B, the mounting mechanism 400 (support structure) statically retains the positions of the detection mechanism 100, the treatment mechanism 200, and the verification mechanism 500 relative to a longitudinal axis of the mounting mechanism 400. The mounting mechanism 400 is preferably a chassis or frame, but can alternatively be any other suitable mounting mechanism. The mounting mechanism 400 preferably includes a first set of coaxial wheels, each wheel of the set arranged along an opposing side of the mounting mechanism 400, and can additionally include a second set of coaxial wheels, wherein the rotational axis of the second set of wheels is preferably parallel the rotational axis of the first set of wheels. However, the mounting mechanism 400 can include any suitable number of wheels in any suitable configuration. The mounting mechanism 400 preferably includes a coupling mechanism 402, such as a hitch, that functions to removably or statically couple to a drive mechanism, such as a tractor, more preferably to the rear of the drive mechanism (such that the system 10 is dragged behind the drive mechanism), but alternatively the front of the drive mechanism or to the side of the drive mechanism. Alternatively, the mounting mechanism 400 can include the drive mechanism (e.g., a motor and drive train coupled to the first and/or second set of wheels). The detection mechanism 100 is preferably mounted to the mounting mechanism 400, such that the detection mechanism 100 traverses over a geographic location before the treatment mechanism 200 traverses over the geographic location. In one variation of the system 10, the detection mechanism 100 is statically mounted to the mounting mechanism 400 proximal the coupling mechanism and the treatment mechanism 200 is mounted to the mounting mechanism 400 distal the coupling mechanism, with the detection mechanism 100 arranged therebetween. In variants including a verification mechanism 500, the verification mechanism 500 is preferably arranged distal the detection mechanism 100, with the treatment mechanism 200 arranged therebetween, such that the verification mechanism 500 traverses over the geographic location after treatment mechanism traversal. However, the mounting mechanism 400 can retain the relative positions of the system components in any other suitable configuration.

The system 10 can additionally include a verification mechanism 500 that functions to record a measurement of the ambient environment of the system 10, which is used to verify or determine the extent of plant treatment. The verification mechanism 500 preferably records a measurement of the geographic area previously measured by the detection mechanism 100. More preferably, the verification mechanism 500 records a measurement of the geographic region encompassing the plant treated by the treatment mechanism 200. The verification mechanism measurement can additionally be used to empirically determine (e.g., calibrate) treatment mechanism operation parameters to obtain the desired treatment effect. The verification mechanism 500 can be substantially similar (e.g., be the same type of mechanism as) the detection mechanism 100, or be different from the detection mechanism 100. The verification mechanism 500 can be a multispectral camera, a stereocamera, a CCD camera, a single lens camera, hyperspectral imaging system, LIDAR system (light detection and ranging system), dyanmometer, IR camera, thermal camera, humidity sensor, light sensor, temperature sensor, or any other suitable sensor. In one variation, the verification mechanism 500 measures plant position, wherein comparison between the plant position as measured by the detection mechanism 100 and the verification mechanism 500 enables determination of plant dislodgement. In another variation, the verification mechanism 500 measures plant color, wherein comparison between the plant color as measured by the detection mechanism 100 and the verification mechanism 500 enables determination of plant cauterization. In another variation, the verification mechanism 500 measures an amount of dye color, wherein the dye is included in the working fluid. However, the verification mechanism 500 can be used to measure any other suitable parameter indicative of plant treatment. The verification mechanism 500 is preferably arranged at the same angle as the detection mechanism 100, but can alternatively be arranged at a different angle (e.g., at an angle between a gravity vector or a 90 degree angle to the substrate plane and a vector perpendicular to the gravity vector or parallel to the substrate plane).

The system 10 can additionally include a power source, which functions to power the system components, including the detection mechanism 100, control system, and treatment mechanism 200. The power source can be mounted to the mounting mechanism 400, can be removably coupled to the mounting mechanism 400, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source.

The system 10 can additionally include a communication apparatus, which functions to communicate (e.g., send and/or receive) data between the control system and a set of remote devices. The communication apparatus can be a WiFi communication system, a cellular communication system, a short-range communication system (e.g., Bluetooth, NFC, etc.), or any other suitable communication system.

2. Method

Figure 14:
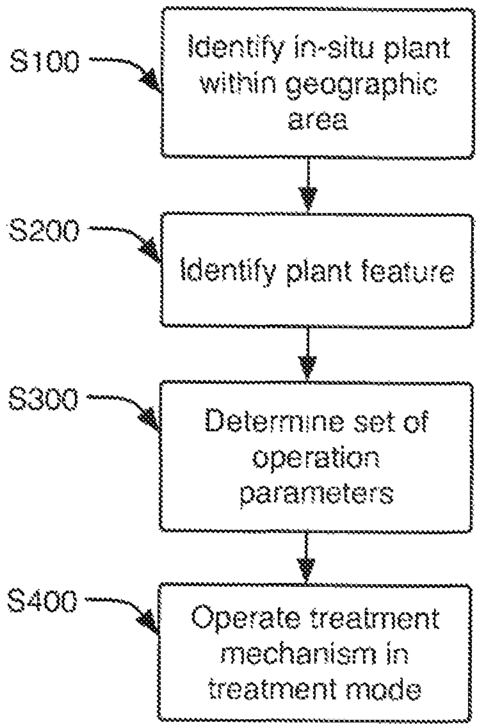
FIG. 14 is a flowchart diagram of the method of plant treatment.
Figure 15:
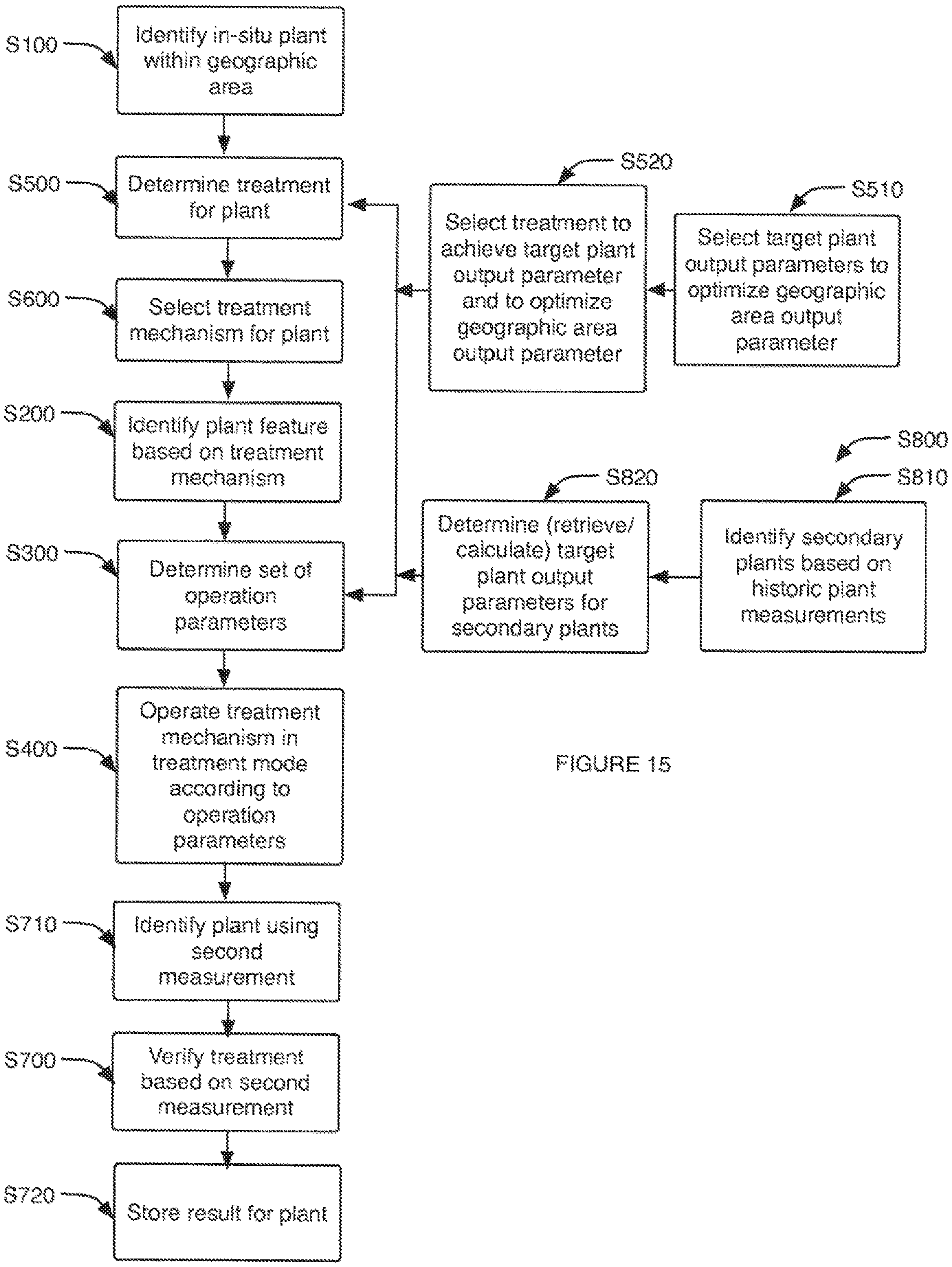
FIG. 15 is a flowchart diagram of a variation of the method of plant treatment.

As shown in FIG. 14, the method for plant treatment includes identifying a plant within a geographic area S100, identifying a plant feature for use in treatment application S200, determining a set of operation parameters for a treatment mechanism S300, and operating the treatment mechanism in the treatment mode S400. The method functions to provide treatment on a plant-by-plant basis. However, the method can function to provide treatment to set of plants (e.g., a set of plants located within a 10 ft by 10 ft area) or to any suitable number of plants. The method can additionally function to optimize plant treatment across a geographical area (e.g., a plant field) including a set of plants (e.g., one or more plants) to optimize a geographic area output parameter, such as crop yield or any other suitable geographic area output parameter as discussed above, an example of which is shown in FIG. 15.

The method is preferably performed by the system 10 described above, more preferably by the control system controlling the system described above, but can alternatively be performed by a remote computing system (e.g., a mobile device of a user, a remote server system, etc.), or performed by any other suitable computing system. For the purposes of the below description, determining a variable or parameter based on a reference variable or parameter can include calculating, selecting (e.g., from a graph or chart), estimating, iteratively converging, or otherwise determining the variable or parameter using the reference variable or parameter.

Identifying a plant within a geographic area S100 functions to identify a subject for treatment. The plant is preferably identified in-situ within the geographic area, wherein the plant remains rooted to the ground during plant identification and treatment initiation. As discussed above, the plant is preferably rooted in a field, but can alternatively be rooted in a pot or any other suitable location. Identifying the plant can include receiving a first measurement for a geographic area from a sensor as the sensor translates within the geographic area and identifying a plant based on the first measurement. The sensor is preferably the detection mechanism 100, but can alternatively be any other suitable sensor. The sensor preferably translates as part of the system, wherein the system can be passively driven or actively driven, but can alternatively translate in any other suitable manner. The first measurement is preferably captured by the sensor, but can alternatively be received by the sensor (and transmitted from a second source), or otherwise obtained by the sensor. The sensor preferably captures a series of measurements at a predetermined frequency during sensor translation, wherein each measurement is subsequently analyzed for a plant, but can alternatively capture measurements in response to trigger events, such as a change in an environmental parameter (e.g., a light change). The first measurement is preferably an optical image, but can alternatively be an acoustic measurement, a haptic measurement, a temperature measurement, an electric measurement (e.g., conductance), a compound measurement, a wind speed measurement, a light measurement, or any other suitable measurement. The optical image preferably includes both the substrate 70 (e.g., soil, ground plane) and the plant. The optical image can be captured from the top of the plant (e.g., with a field of view substantially perpendicular a gravity vector or parallel a substrate plane, within a margin of error), the side of the plant (e.g., with a field of view substantially parallel a gravity vector or perpendicular a substrate plane, within a margin of error), at an angle between the top and side of the plant, toward the substrate 70, or at any other suitable angle. The optical image can be a single image, a first and second image concurrently captured by a first and second statically coupled sensor (e.g., a stereoview captured with a stereocamera), a multispectral image, a hyperspectral image, a reflected pattern of light (e.g., as in LIDAR), or any other suitable optical image. One or more optical images of the same geographic area can be captured by one or more sensors, concurrently or asynchronously.

Identifying a plant based on the first measurement preferably includes identifying the plant within the image, but can alternatively include identifying the plant based on a change in the ambient environment (e.g., measured light) as the system moves along the geographic area, or identified in any other suitable manner. The plant is preferably identified using image processing techniques, such as pixilation, linear filtering, principal components analysis, independent component analysis, hidden Markov models, anisotropic diffusion, partial differential equations, self-organizing maps, neural networks, wavelets, convolutional nets, histogram of gradient features, gradient features, general Markov modeling (color), or any other suitable technique. The plant can additionally or alternatively be identified using the system and method described in U.S. application Ser. No. 13/788,320 filed 7 Mar. 2013, incorporated herein in its entirety. In one example, identifying the plant preferably includes extracting the ground plane from the optical image (e.g., based on color, planarity, etc.), identifying a plant within the image using color and/or shape analysis (e.g., identifying colors, such as green, that are associated with plants and less associated with substrate 70). In another example, identifying the plant includes applying background segmentation to identify a plant in the foreground.

Identifying a plant feature for use in treatment application S200 functions to identify a portion of the substrate 70 from which a treatment position can be determined. The plant feature can be a leaf or set of leaves, a stem, a node, a petiole, an apical bud, a root structure, a shoot structure, a fruit, a fruit feature (e.g., corn silks), a junction 60 between the plant support structure (e.g., stem) and the substrate 70 (ground plane) or junction 60 between the root structure and shoot structure, or any other suitable portion of the plant. The plant feature can alternatively or additionally be a plant characteristic or parameter, such as a plant index value (e.g., NDVI, leaf area index, etc.), a color, shape, location, or any other suitable characteristic. Plant indices can include Normalized Difference Vegetation Index (NDVI), Transformed Chlorophyll Absorption in Reflectance Index normalized by Optimized Soil-Adjusted Vegetation Index (TCARI/OSAVI), Normalized Difference Red Edge Index (NDRE), Canopy Chlorophyll Content Index (CCCI), Photochemical Reflectance Index (PRI), crop water stress index (CWSI), canopy temperature less air temperature (Tc-Ta), stomatal conductance (G), stem water potential, water stress, water content, Water Band Index (WBI), plant uniformity across the geographic area, Leaf Area Index (LAI), Net Assimilation Rate (NAR), Relative Growth Rate (RGR), Leaf Area Ratio (LAR), Leaf Area Duration (LAD), Crop Growth Rate (CGR), plant index value change over time, plant index value change rate, absolute growth rate in volume, absolute growth rate in number, absolute growth rate in mass, or any other suitable plant index. The plant feature is preferably identified from the first measurement, more preferably within the first optical image, but can alternatively be identified from a second measurement of the same geographic area, the same plant, or any other suitable measurement. The second measurement can be the same type of measurement as the first measurement, or can alternatively be a different type of measurement. The plant feature is preferably identified using image processing techniques, as discussed above, but can alternatively be determined in any other suitable manner.

In one variation, identifying a plant feature for use in treatment application S200 can include capturing an image of the plant with a sensor and processing the image to identify the plant feature. Capturing an image of the plant with a sensor can include recording an image of the plant and the substrate 70, the image including a vector oriented at an angle between a plane of the substrate surface and a gravity vector, but can alternatively include capturing the image of the plant in any other suitable manner at any other suitable angle (e.g., as described above). Processing the image to identify the plant feature can include extracting a ground plane from the image, and identifying a plant feature contiguous with or otherwise associated with a plant proximal the sensor within the image.

Determining a treatment position functions to determine a global position at which the treatment should be applied. The treatment position can be a point, a line, or an area. The treatment position can be a geographic position (e.g., set of latitude and longitude coordinates, set of coordinates with altitude, etc.), a relative position (e.g., relative to the plant, relative to a plant feature or portion), or any other suitable position. Examples of treatment positions include a position on the substrate 70 relative to a stem junction with the substrate 70, an interleaf position between a superior and inferior leaf (e.g., as determined relative to a gravity vector), a position relative to the plant feature (e.g., superior the plant feature along a gravity vector, next to the plant feature, etc.) a position of a plant feature, such as an apical bud, corn silk, node, or other feature, a local minima or maxima of a plant parameter for a plant portion (e.g., cross-sectional dimension of a plant stem), or any other suitable treatment position. The treatment position is preferably determined based on the treatment mechanism to be used, but can alternatively be determined in any other suitable manner. A location (position) can be a set of geographic coordinates (e.g., latitude and longitude), a place name (e.g., county, city, landmark, intersection, etc.), a physical street address, distance from a given location, presence within a specified radius from a given location, a graphical depiction on a map, or any other suitable location expression. The location can be determined based on GPS coordinates provided by a device, triangulation between mobile phone towers and public masts (e.g., assistive GPS), Wi-Fi connection location, WHOIS performed on IP address or MAC address, GSM/CDMA cell IDs, location information self-reported by a user, or determined in any other suitable manner.

Determining the treatment position preferably includes determining a position of the plant feature and determining the treatment position based on the plant feature position. The plant feature position can be a relative position (e.g., relative to a system component, such as the sensor, treatment mechanism, etc.) or a global position (e.g., absolute position). The plant feature position is preferably determined based on the first measurement, but can alternatively be determined based on a second measurement. In one example, the plant feature distance from the system component can be determined (e.g., estimated) from an image, based on optical analyses techniques (e.g., LIDAR, stereoview analysis, etc.). The global position of the sensor is approximated or known, based on a position measurement from a positioning mechanism (e.g., GPS, triangulation system, etc.). The plant feature position is determined based on a combination of the global position of the system, the angle of the sensor relative to the direction of travel (e.g., based on an accelerometer, GPS, etc.), and the estimated distance of the plant feature from the system. In another example, the plant feature or plant global position is known (e.g., determined during a prior treatment or measurement session), wherein the plant can be uniquely identified, the respective global position retrieved, and the treatment position determined based on the retrieved global position. The plant can be uniquely identified based on the estimated geographic position, a plant marker (e.g., an RFID tag), a plant variable (e.g., the lean of a stem, the pattern of sunspots, the pattern of bug marks or bites, the pattern of surrounding plants, etc.), or based on any other suitable identifier or combination thereof, unique or non-unique. However, the treatment position can be otherwise determined.

Determining the treatment position can additionally or alternatively include determining the position of the treatment mechanism relative to the treatment position. More preferably, the position of the treatment mechanism active area (e.g., area to which the treatment can be applied) relative to the treatment position is determined. The position is preferably an instantaneous position, but can alternatively be an estimated position or any other suitable position. This position is preferably the geographic distance between the treatment mechanism and the treatment position, but can alternatively be a height differential or any other suitable position. This position can subsequently be used to determine an amount of time between an instantaneous time and the time at which the treatment mechanism is to be operated in the treatment mode (e.g., treatment initiation time). Determining the position of the treatment mechanism relative to the treatment position preferably includes determining the treatment position relative to the plant feature, and determining the active area position relative to the treatment position. However, the active area position relative to the treatment position can alternatively be determined without determining the treatment position relative to the plant feature (e.g., wherein the treatment position is determined relative to the system position). Determining the active area position relative to the treatment position preferably includes determining a first distance between the treatment position and a reference position (e.g., sensor position or position mechanism position) and determining the active area position relative to the treatment position based on the first distance and a known distance between the reference position and the active area position. However, the active area position relative to the treatment position can be otherwise determined.

Determining a set of operation parameters for a treatment mechanism S300 (treatment mechanism operation parameters) functions to determine operation parameters that will achieve a target plant parameter value (target plant parameter, target effect on the plant, desired effect). The target plant parameter value is preferably determined (e.g., selected, computed, etc.) based on optimization of a geographic area output parameter, wherein a plant having the target plant parameter value preferably contributes to geographic area output parameter optimization. However, the target plant parameter value can be determined based on plant health, plant proximity to adjacent plants, or based on any other suitable plant parameter. The target plant parameter can be plant viability, plant health, available water volume, growth regulator concentration, electric stimulation, available light, available chemical compound, or any other suitable target plant parameter. Example values of plant viability include plant necrosis and plant retention. Example values of plant health include plant growth stimulation or retardation.

The set of treatment mechanism operation parameters can be determined based on a reference value, but can alternatively be determined in any other suitable manner. The reference value can be a substantially instantaneous plant measurement, a historical measurement for the plant (historical plant parameter measurement), a substantially instantaneous measurement for the geographic area (e.g., ambient environment parameter), a historical measurement for the geographic area, an anticipated effect of applying the treatment using the operation parameters on a second plant located within the geographic area (e.g., as described below), a plant classification (e.g., plant type, plant maturity, etc.), classifiers or any other suitable parameter for the plant or set of plants determined from historical measurements, or be any other suitable measurement. The substantially instantaneous measurement can be the first measurement, or be a second measurement for the plant recorded within a predetermined time window, such as within several seconds or several minutes. However, the treatment mechanism operation parameters can be selected based on system parameters or characteristics, or based on any other suitable parameter. For example, the shutoff event for a spray mechanism can be determined based on the amount of anticipated, historical, or otherwise determined overspray (e.g., due to solenoid closure delay). However, the treatment mechanism operation parameters can be otherwise determined.

The set of treatment mechanism operation parameters can be a parameter of a treatment mechanism output, a parameter of a treatment mechanism input, or any other suitable operational parameter. Examples of treatment mechanism operation parameters include a treatment initiation position (e.g., a geographic location at which the treatment is to begin), the treatment position (e.g., geographic location, height relative to the substrate 70, angle relative to an axis of the support mechanism, etc.), a treatment initiation time (e.g., an absolute timestamp or relative time point at which the treatment is to begin), power input or output settings (e.g., wattage, electric voltage, electric current, etc.), output pressure, flow rate, working fluid composition, spray profile, plant coupling force, or any other suitable operational parameter.

Determining the set of treatment mechanism operation parameters can include selecting the treatment mechanism operation parameters from a predetermined chart or grid based on the reference value(s), calculating the treatment mechanism operation parameters using the reference value(s), empirically determining the treatment mechanism operation parameters, iteratively analyzing different sets of treatment mechanism operation parameters until a set of parameters anticipated to result in the target effects for the plant and/or secondary plants is achieved, or determined in any other suitable manner. Empirically determining the treatment mechanism operation parameters can include selecting a first set of treatment mechanism operation parameters, treating a first plant by operating the treatment mechanism based on the first set of treatment mechanism operation parameters, receiving a second measurement of the treated plant, analyzing the second measurement for treatment efficacy (e.g., whether a target plant parameter value has been achieved, whether the plant has been necrosed, whether a fluid treatment has been applied, the degree of treatment application, etc.), and selecting a second set of treatment mechanism operation parameters or generating a second set of treatment mechanism operation parameters based on the first set of treatment mechanism operation parameters. Iteratively analyzing different sets of treatment mechanism operation parameters can include selecting a first set of treatment mechanism operation parameters, estimating a first effect of a treatment applied by the treatment mechanism operating based on the first set of treatment mechanism operation parameters on the plant and/or secondary plants, selecting a second set of treatment mechanism operation parameters, estimating a second effect of the treatment applied by the treatment mechanism operating based on the second set of treatment mechanism operation parameters on the plant and/or secondary plants, comparing the first and second effects for proximity to the target plant parameter value for the plant and/or secondary plants, and selecting the set of treatment mechanism operation parameters estimated to result in the effect closest to the target plant parameter.

Operating the treatment mechanism in the treatment mode S400 functions to control the treatment mechanism to apply the treatment to the treatment position to treat the plant. The treatment mechanism is preferably operable between a treatment mode and a standby mode, but can additionally or alternatively be operable in any other suitable mode. Operating the treatment mechanism in the treatment mode S400 preferably includes operating the treatment mechanism based on the set of operation parameters (e.g., within a margin of error, such as 5%, 2%, etc.). The treatment mechanism is preferably operated in the treatment mode in response to the occurrence of a treatment initiation event, but can alternatively be operated in response to any other suitable condition being satisfied. Examples of treatment initiation events include satisfaction of an operation parameter, satisfaction of the initial treatment parameter (e.g., identifying the plant from the first measurement, the position of the active area of the treatment mechanism substantially meeting the plant position, etc.), the active area of the treatment mechanism substantially aligning with a treatment position, an instantaneous global timestamp substantially meeting a treatment initiation timestamp, an estimated duration until the treatment mechanism will align with a plant feature substantially meeting a treatment duration, or any other suitable treatment event.

Operating the treatment mechanism based on the set of operation parameters can include controlling the treatment mechanism to output a treatment substantially satisfying (e.g., within a margin of error) the set of treatment parameters, but can alternatively include operating the treatment mechanism with a set of inputs substantially satisfying the set of treatment parameters or operating the treatment mechanism in any other suitable manner. Operating the treatment mechanism in the standby mode preferably includes sealing or halting material input to the treatment mechanism (e.g., halting power provision, fluid provision, etc.), but can alternatively include any other suitable method of ceasing, halting, or pausing treatment application.

Operating the treatment mechanism in the treatment mode S400 can additionally include aligning the treatment mechanism active area with the treatment position. In a first variation, aligning the treatment mechanism active area with the treatment position includes actuating the treatment mechanism to align the active area with the treatment position. In one example, aligning the active area with the treatment position includes actuating the application mechanism (e.g., a conductive wire or plate pair of an electrical discharge device) such that the application mechanism is substantially aligned with the treatment position(s) (e.g., within a margin of error). In this example, the treatment mechanism can additionally include an actuation mechanism, such as a linear element (e.g., a screw or telescoping element) that increases the distance of the active area from the mounting mechanism, a rotational element that permits angular actuation about a rotational axis, or any other suitable actuation element. In a second variation, the treatment mechanism active area can be passively aligned, wherein aligning the treatment mechanism active area with the treatment position can include moving the entire system such that the treatment position is in range of the active area or the active area is aligned with the treatment position. For example, as shown in FIG. 17B, system traversal along the geographic area can align the active area with the treatment position as the system travel path passes by the treatment position. However, any other suitable alignment method or combination thereof can be used to align the active area with the treatment position.

The method can additionally include determining a treatment for the plant S500, which functions to determine an action that will result in the desired effect on the plant (e.g., result in the target plant parameter values). Example treatments include: dislodging the plant from the supporting substrate S110, removing a plant portion from the plant, cauterizing the plant or a portion thereof (e.g., by application of a first amount of electric discharge or heat) S120, stimulating plant growth with application of a second amount of electric discharge, regulating plant growth with application of a first amount or concentration of growth regulator (e.g., retardant, hormone, fertilizer, etc.), necrosing the plant with application of a second amount or concentration of growth hormone or fertilizer, necrosing the plant by application of a first amount of heat, necrosing the plant by removal of a first amount of heat, necrosing the plant by removal of an ambient environment parameter (e.g., air, water, sunlight, etc.), retarding plant growth, or any other suitable treatment. Selecting an action for a plant can include selecting nutrient application, disease-inducing or disease-prevention compound application, pesticide application, insecticide application, fungicide application, defoliant application, or application of any other suitable compound or treatment to an individual plant within a plant field. Selecting the action can additionally include selecting the amount of the compound (e.g., volume, concentration, duration, etc.) to apply to the plant. Alternatively, selecting an action for a plant can include selecting an action for the plant ambient environment, such as irrigating the plants on a plant-by-plant basis. Selecting an action for the plant can additionally include selecting how the plant environment should be changed, such as selecting and/or controlling the operation of individual pipelines or driplines remote from the system, determining how deep or wide of an individual irrigation ditch should be created, based on the plant characteristics, the plant ambient environment parameters, and/or the characteristics of the neighboring plants. Alternatively, any other suitable action can be selected for the identified plant.

Figure 17A:
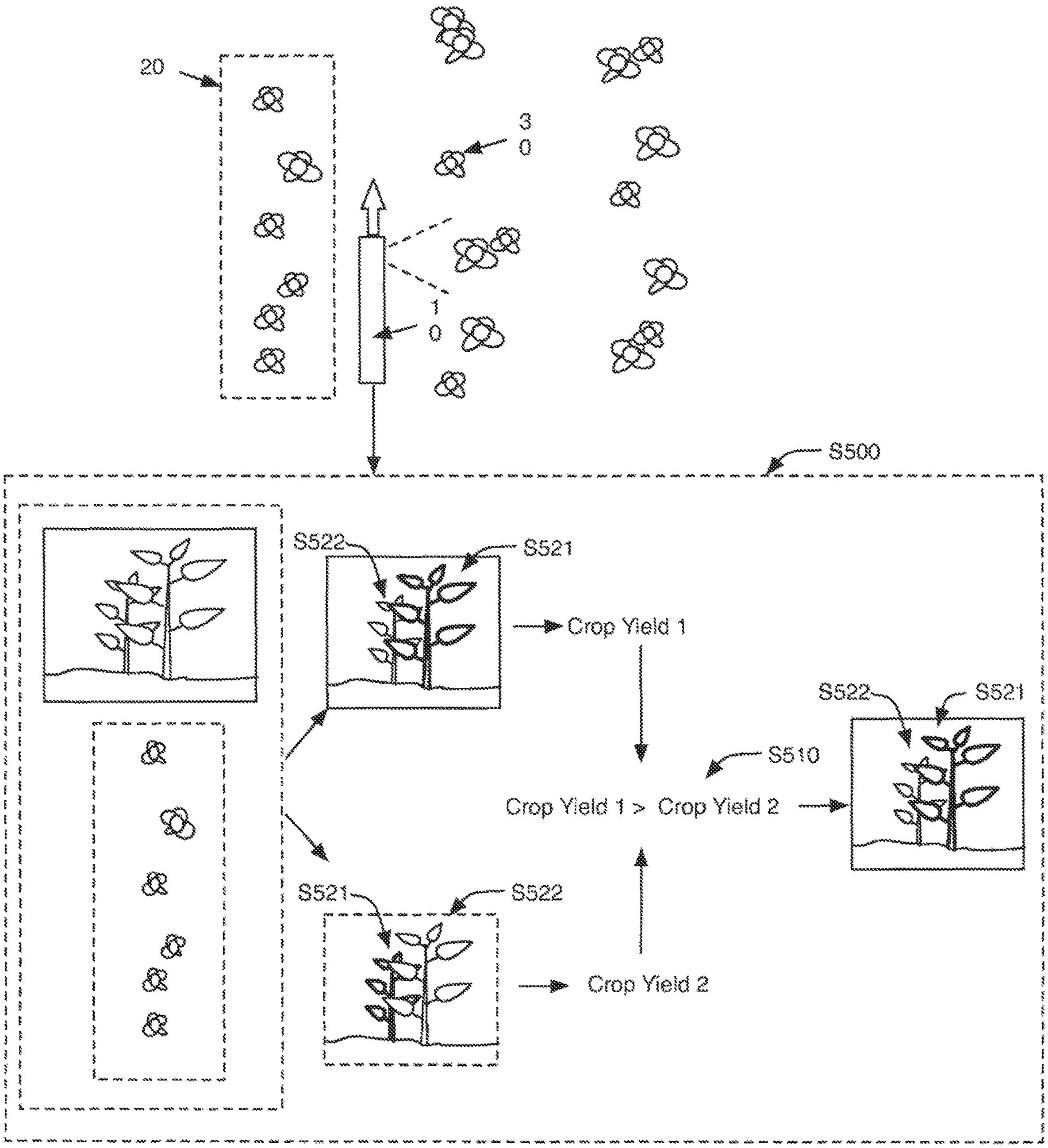
FIGS. 17A and 17B is a schematic representation of selecting a treatment for a plant based on geographic area output parameter optimization and treating the plant with the selected treatment, respectively.
Figure 17B:
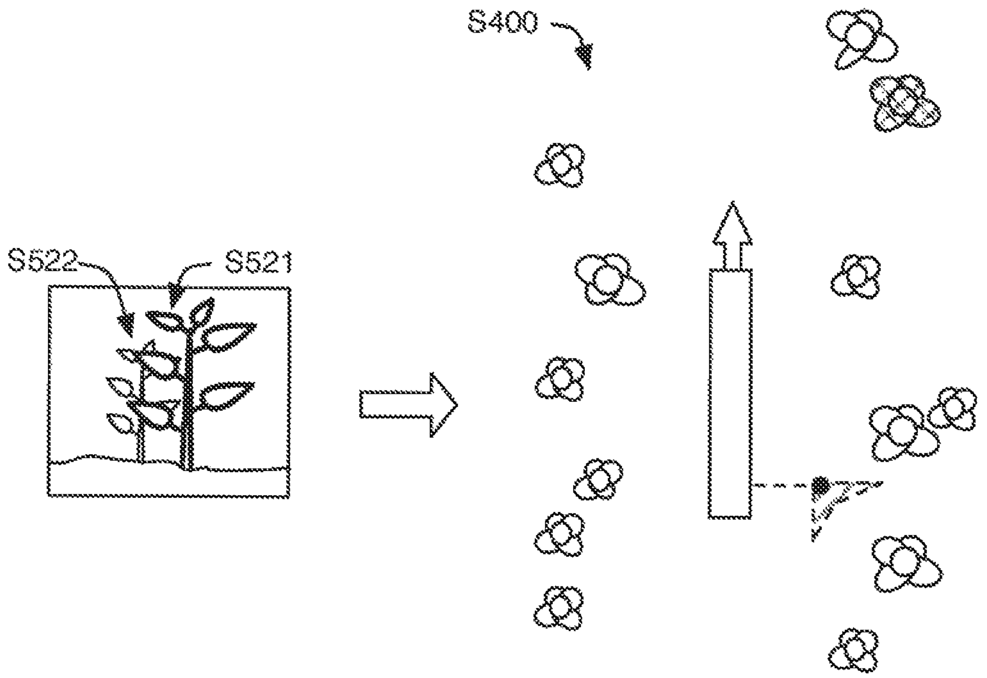

The treatment for the plant is preferably determined based on optimization of the geographic area output parameter S520, as shown in FIG. 17A. The geographic area output parameter can be optimized by maximizing, minimizing, or otherwise optimizing the resultant geographic area output parameter value. The treatment is preferably selected to promote optimization of the geographic area output parameter, and does not necessarily result in the optimal geographic area output parameter value. Geographic area output parameter optimization is preferably not true optimization, and the method can result in a sub-optimal geographic area output parameter value after treatment. Instead, the optimization preferably promotes the best, second best, or any other suitable usage of the geographic area resources. The geographic area output parameter is preferably optimized based on information of the geographic area (e.g., information for plants previously treated within the geographic area) at the time of decision computation, such that the geographic area output parameter optimization for a given plant is unaffected by the actual parameters of plants within the geographic area that are subsequently treated. However, the geographic area output parameter optimization can be a true optimization, wherein the most effective plant output parameters are selected and achieved through treatment.

The geographic area output parameter is preferably an output parameter for the entirety of the geographic area, but can alternatively be an output parameter for each individual plant, or be any other suitable output parameter. Examples of geographic area output parameters include weed concentration, weed number, weed viability, crop yield, crop uniformity (e.g., in size, color, blemishes, etc.), compound amount (e.g., the mass of sugar that can be harvested from the geographic area), compound concentration per plant, crop concentration per plant, total monetary cost (e.g., minimizing an input cost to produce a desired output), or any other suitable output parameter. The target plant parameter values are preferably adjusted to optimize the geographic area output parameter. Target plant parameters include plant health (e.g., necrosed or retained), plant yield, the anticipated and/or instantaneous degree of plant crowding, plant size, plant color, plant emissions, plant chemical composition, or any other suitable plant output parameter.

The treatment can be determined based on a substantially instantaneous measurement for the plant, recorded within a threshold time period of the instantaneous time (e.g., within several second, microseconds, etc.). More preferably, the treatment can be determined based on plant parameters determined (e.g., calculated, extracted, etc.) from the measurement. The measurement can be the first measurement, or the measurement from which the plant was identified, or can be a different measurement. Plant parameters that can be used in treatment determination include parameters indicative of plant health, such as plant color intensity, plant color hue, color ratio, plant size, plant uniformity (e.g., leaf distribution, stem lean, etc.), plant composition, plant emissions, plant feature (e.g., stomata) size, plant feature distribution over the plant, plant feature distribution over a portion of the plant (e.g., over a leaf), plant feature state (e.g., degree of stomatal opening), or any other suitable parameter. The treatment can additionally or alternatively be selected based on desirable or undesirable phenotypic expressions or physical characteristics. For example, a lettuce plant with spotted leaves can be selected for necrosis, while a lettuce plant with a spot density less than a predetermined density threshold can be selected for retention.

The treatment can additionally or alternatively be determined based on a current parameter value for the geographic area, wherein the parameter values are determined (e.g., recorded, gathered, estimated, etc.) within a threshold time period or within a time window. The time window can be the time of same session operation (e.g., wherein the time window is the duration of continuous system operation), a time window defined before a measurement for a subsequent plant is received, be a predetermined duration after identification of a previous plant, be a duration determined based on the system velocity, or be any other suitable time window. The geographic area parameter values can be determined by the system, determined by a secondary system (e.g., a weather system, an aerial system, etc.), estimated based on a previous treatment or monitoring session, determined by a secondary system (e.g., an airborne system, such as satellite or drone system), determined by a remote system (e.g., a weather report), or determined by any other suitable system in any other suitable manner. The parameter values for the geographic area can include a number of plants within the geographic area, the placement of plants within the geographic area, ambient environment parameters for the geographic area (e.g., sun exposure, wind speed, humidity, temperature, soil conductivity, soil saturation, soil composition, etc.), or values for any other suitable parameter.

The treatment can alternatively or additionally be determined based on historical treatment applications to the geographic area. The treatment can alternatively or additionally be determined based on historical treatment applications to the plant. The historical treatment applications can be treatments applied within a predetermined time window of the instantaneous time, outside of a predetermined time window, or applied at any other suitable time. The historical parameter values for the geographic area can include parameter values of secondary plants 20 within the geographic area that were previously treated during the same operation session of the system (e.g., within the time window of the instantaneous time). The historical parameter values for the geographic area can additionally or alternatively include the parameter values of all or a portion of the plants within the geographic area from a prior operation session of the system. The parameters for the geographic area, secondary plant 50, and/or the plant are preferably similar to those parameters as discussed above, but can alternatively be different parameters, such as trends. Examples of historical parameters include historical treatments. Such treatments can include treatments directly applied to each plant within the same treatment session or in a prior treatment session. Such treatments can include treatments indirectly applied to each plant or set of plants (e.g., due to treatment runoff or carryover), within the same treatment session, in a prior treatment session, or from treatment of an adjacent or proximal field. Determining the amount of indirect treatment applied to a plant can be based on: a set of prior operation parameters for treatment of a second plant within the geographic area at a prior time point, the prior time point within a threshold time period of an instantaneous time; and an ambient environmental parameter for the prior time point (e.g., as determined from historical weather measurements). Such treatments can include treatments applied to the geographic area, or portion thereof, as a whole (e.g., a crop dusting treatment). Such treatments can include past weather events associated with the geographic area, such as rain, thunder, and sunlight. However, any other suitable historical information can be used. The historical information is preferably retrieved from memory, such as on-board memory, a remote server system, or any other suitable memory, but can be received (e.g., from the remote server system, the plant, or any other suitable source) or otherwise obtained.

The treatment can additionally or alternatively be determined based on the anticipated effect of the treatment on secondary plants 50 (e.g., indirect treatments), as discussed below.

In a first variation of treatment determination, the treatment for each plant of the geographic area can be predetermined prior to receipt of the first measurement for a first plant of the geographic area or initiation of a treatment session for the geographic area. This variation preferably includes retrieving historical information for each plant (e.g., plant parameter values) within the geographic area from a database, determining the treatment for each plant based on the historical information, and treating each plant according to the respective treatment in response to the system encountering the plant within the geographic area. Alternatively or additionally, this variation can be performed using future information for each plant or the geographic area, wherein the future information (e.g., future treatments, etc.) can be determined based on historical information, estimated, or otherwise determined. This variation is preferably performed separately (e.g., asynchronously) with treatment of plants within the geographic area, but can alternatively be performed concurrently with treatment of plants within the geographic area.

In a second variation of treatment determination, the treatment for each plant of the geographic area can be predetermined prior to receipt of the first measurement for the respective plant. More preferably, the treatment for each plant can be determined during treatment of secondary plants 50 within the geographic area, or determined during the treatment session for the geographic area (e.g., within a time window prior to the time at which the plant is treated, wherein the time window can be predetermined, be a duration of continuous system operation, or be any other suitable time window), after treatment of the secondary plant 50. However, the treatment can be determined at any other suitable time. In this variation, the treatment for the plant is preferably determined based on the treatment of and/or anticipated treatment effect for a secondary plant 50, wherein the decision of whether to necrose S521, retain S522, and/or stimulate growth of the secondary plant 50 affects the treatment that is selected for the plant. The secondary plant treatment (actual or estimated) or secondary plant treatment decision preferably affects the treatment decision for the first plant through the geographic area output parameter optimization, but can alternatively influence the treatment decision for the first plant in any other suitable manner. The treatment decision for the first plant is preferably dynamically adjusted in response to treatment of the secondary plant 50, but can alternatively be determined in any other suitable manner. The treatment decision for the first plant can additionally be determined based on historical parameters or on any other suitable reference value. In one example, a first plant can be assigned to be necrosed, but as the system monitors and treats the secondary plants within the geographic area, the first plant can be reassigned to be retained (e.g., in response to overtreatment, such as overfertilization, of a secondary plants that were meant to be retained).

In a third variation of treatment determination, the treatment for each plant of the geographic area can be dynamically determined, in response to identification of the plant within the geographic area. In this variation, the treatment for each plant can be determined based on the historical parameter values for the geographic area. The treatment for each plant can additionally or alternatively be based on a substantially instantaneous measurement for the plant for which a treatment is to be determined, wherein the measurement is preferably recorded and/or received within a second time window. The treatment for each plant can additionally or alternatively be determined based on the treatments applied to and/or anticipated treatment effects on secondary plants 50 within the geographic area within the same session. The treatment for each plant can additionally or alternatively be determined based on an anticipated effect of the treatment applied to the secondary plant 50 on the plant to be treated (primary plant 40). The treatment can additionally or alternatively be selected based on any other suitable information. For example, in response to identification of a plant, the system determines whether to retain, necrose, or stimulate the plant based on the following factors: the treatments previously applied to secondary plants within the geographic area during the same session and the estimated or confirmed treatment effects on the secondary plants; the estimated viability of the plant based on the estimated plant health (e.g., as determined based on the ratio of green to brown in an optical image), the forecasted weather, the prior treatments applied to the plant by systems or the environment, and the effect that a treatment can have on the plant; the interaction of the necrosed, retained, or stimulated plant on neighboring plants, and/or any other suitable factors. In particular, the factors can be used to determine which course of action would optimize the geographic area output parameter. However, the treatment can be determined in any other suitable manner.

Figure 16A:
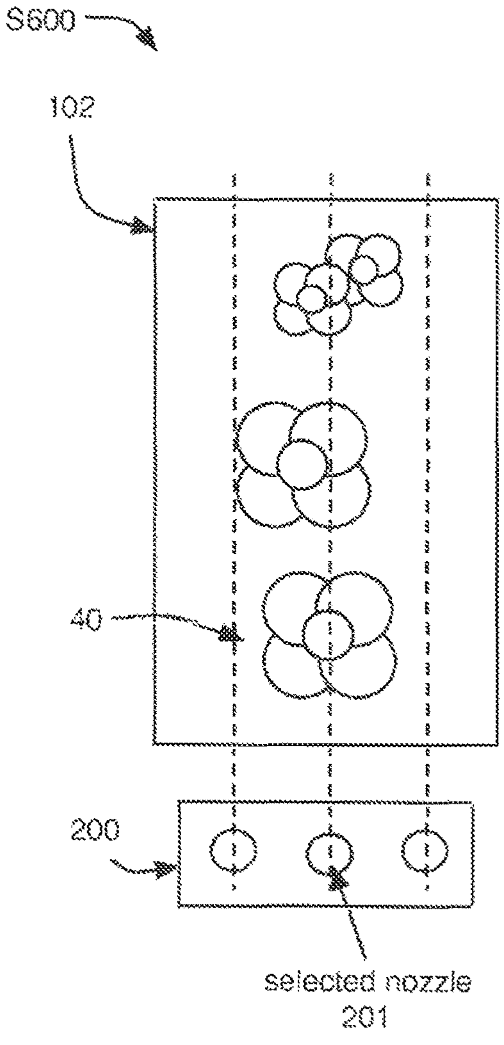
FIGS. 16A and 16B are schematic representations of treatment mechanism selection in a first and second variation of the treatment mechanism, respectively.

Determining the treatment and/or determining the treatment operation parameters can additionally include selecting a treatment mechanism S600. This can be desirable when the system includes multiple treatment mechanisms, of the same type or different types. The treatment mechanism is preferably selected based on a prediction of the future location of the plant relative to a given treatment mechanism, based on the location of the plant and the location, direction of travel, velocity, and/or acceleration of the system. The selected treatment mechanism 201 is preferably the treatment mechanism that is anticipated to be closest to the plant or anticipated to have the best application angle for the plant, as shown in FIG. 16A. For example, in a system having multiple treatment mechanisms of the same type (e.g., all nozzles) fixedly arranged in a row perpendicular to a direction of travel, a treatment mechanism on the left can be selected to act on a plant to the left of the system, while a treatment mechanism on the right of the system can be selected to act on a plant to the right of the system. In another example, the treatment mechanisms can be arranged such that the treatment mechanisms apply the treatment at a low angle relative to a normal vector relative to the ground (e.g., less than 90° from the ground, less than 60° from the ground, etc.) to apply the treatment to the stem, base, or roots of the plant while avoiding the leaves. In this example, a treatment mechanism on the right can be selected to act on a plant to the left of the system, due to the improved angle of application.

The treatment mechanism is additionally or alternatively selected based on the state of operation of the treatment mechanism. More preferably, the treatment mechanism is preferably selected based on the amount of time required for the treatment mechanism to achieve an active state and the amount of time before the treatment mechanism is in a suitable position to apply a treatment to the plant. Each treatment mechanism is preferably operable between an active and inactive mode, and can additionally be operable in a standby mode. Each treatment mechanism can additionally require a period of time to ramp up to the active mode from the inactive mode or the standby mode. For example, plasma ionizers need time to charge the electrodes, spray nozzles need time to pressurize and pump the spray fluid to the nozzle 211, and RF cutters need time to heat. A treatment mechanism is preferably selected when the estimated amount of time required for the treatment mechanism to be operable in the active mode is less than or substantially equal to the estimated amount of time for the treatment mechanism to reach a suitable treatment position for the plant (e.g., reach the plant center, reach a distance that permits clear treatment access to the stem, etc.). The estimated amount of time required for the treatment mechanism to be operable in the active mode is preferably a predetermined duration (e.g., set by the manufacturer), but can alternatively be selected from a chart or graph based on the operation history of the treatment mechanism, environmental parameters (e.g., moisture, wind, temperature, etc.), or any other suitable variable that may influence the treatment mechanism ramp up time. In another alternative, the estimated ramp up time can be determined empirically. The ramp up time for a given treatment mechanism can be measured during operation (e.g., with a timer), wherein the estimated ramp up time for subsequent treatment mechanism operations is set to the measured ramp up time.

Figure 16B:
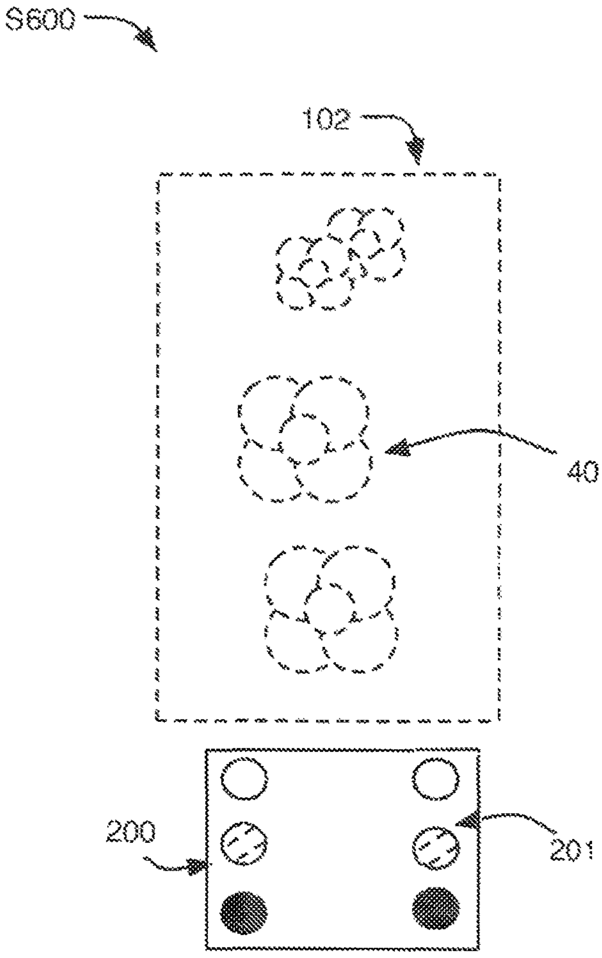

Alternatively, when a system includes multiple treatment mechanisms that apply different types of treatments, the treatment mechanism is additionally or alternatively selected based on the treatment mechanism efficacy in achieving the desired plant response, as shown in FIG. 16B. The treatment mechanism is preferably selected based on the plant type or plant characteristics, but can alternatively be selected based on other factors. More preferably, treatment mechanisms with treatments having high efficacies in achieving the desired plant response for the identified plant characteristics are selected. For example, electric cauterization can be selected to necrose free-standing plants (e.g., plants that are not contiguous or touching an adjacent plant), while fertilizer spray can be selected to necrose close-growing plants. Alternatively, treatment mechanisms having lower efficacies in achieving the desired plant response can be selected, particularly when the treatment mechanism has a higher accuracy, or when the treatment mechanism has a higher coverage area and multiple plants in close proximity are to be acted upon in the same manner.

The treatment mechanism can additionally or alternatively selected based on the cost of achieving the desired plant response with the treatment mechanism. The cost of achieving the desired plant response is preferably determined based on the cost of the treatment amount required to achieve the desired response. In one variation of the method, the treatment mechanism is selected based on the market cost of the treatment material. The treatment mechanism can be selected based on the dynamically shifting market price of the treatment material, wherein the system is preferably networked to a dynamically updated marketplace. Alternatively, the market cost of the treatment material can be entered prior to system operation, can be determined based on the cost of fuel (to transport the system), or be determined in any other suitable manner. For example, electric cauterization can be selected in response to the cost of fertilizer spray exceeding the cost of electricity required to power the electric cauterization mechanism.

The treatment mechanism can additionally or alternatively selected based on a desired resultant growing environment for the retained crops. The treatment mechanism can be selected based on the desired resultant soil composition, pest control, or based on any other suitable environmental factor. This can be preferable when a system includes multiple treatment mechanism types whose treatments each leave a different treatment product. For example, in order to achieve plant necrosis, a high fertilizer concentration must be applied to the plant. This leaves the area occupied by the plant and the surrounding area highly fertilized, which can be conducive to growth of certain plants and prohibitive to growth of other plants. In this example, fertilizer can be selected as a necrosing agent when plants promoted by extremely fertilized land are desired. In another example, the treatment products of electric cauterization include ash and decaying plant matter, which can be used as soil amendment to adjust the chemical and physical properties of the soil. This can result in more favorable growing conditions for the retained plants.

The treatment mechanism can additionally or alternatively selected based on environmental parameters of the ambient environment. This can be preferable when treatment application can be affected by environmental factors such as wind 12 or humidity. Selecting the treatment mechanism based on environmental parameters preferably includes measuring a parameter of the ambient environment with a sensor and selecting the treatment mechanism based on the measurement. Selecting the treatment mechanism can additionally include selecting a second treatment mechanism, having a different treatment type than the first treatment mechanism, in response to a change in the measured parameter. However, the treatment mechanism can be selected in any other suitable manner.

In one variation of the method, the treatment mechanism is selected based on a weighted average of the aforementioned factors. A weighted average is preferably calculated for each treatment mechanism, wherein the treatment mechanism with the highest score can be selected. The weights for the factors can be manually or automatically adjusted. The weights can be automatically adjusted based on the duration of system operation, environmental parameter measurements (e.g., one factor is given more weight in response to an environmental parameter measurement exceeding a predetermined threshold), treatment material levels within the system, availability of the treatment mechanism, or based on any other suitable adjustment factor. The weighted average is preferably determined from scores assigned to each factor for the given treatment mechanism. The scores are preferably ranks, but can alternatively be any other suitably determined score.

The method can additionally include verifying plant treatment S700, which functions to determine the treatment that was actually applied to the plant. Verifying plant treatment S700 can additionally function to determine the effect of the applied treatment on the plant. Verifying the plant treatment can include recording a second measurement of the geographic area S710, more preferably a second measurement of the plant or plant portion, after treatment mechanism operation in the treatment mode and/or after treatment application to the plant; determining a verification indicator value based on the second measurement; and comparing the determined verification indicator value to a reference indicator value indicative of effective treatment. Verifying plant treatment S700 can additionally include storing the second measurement, verification indicator value, or any other suitable verification information in association with a plant identifier S720.

The second measurement can be the same type of measurement as the first measurement, but can alternatively be a different measurement type. In one example, recording the second measurement includes recording an optical image of the plant after treatment mechanism operation in the treatment mode. In another example, the second measurement can be a single image captured by a CCD camera. The second measurement can be taken at the same angle relative to a reference point (e.g., gravity vector, plant, travel vector, etc.) as the first measurement, or can be taken at a different angle. In one example, the first measurement is taken at a non-zero angle (e.g., between 0 and 90 degrees) to a gravity vector, while the second measurement is taken from the top of the plant. The second measurement is preferably recorded by a second sensor, such as a second camera, wherein the second camera can be statically retained relative to the treatment mechanism, more preferably at a position opposing the first camera across the treatment mechanism (e.g., posterior the direction of system travel).

Determining the verification indicator value based on the second measurement preferably includes extracting a value for the verification parameter from the second measurement, such as by using image processing techniques, signal processing techniques, or any other suitable techniques.

In one example of the method, the treatment is plant dislodgement. Determining the verification indicator value includes analyzing the second measurement to extract plant dislodgement or displacement indicators. Plant dislodgement or displacement indicators include plant features superior a substrate plane (e.g., to extract plant features above the substrate 70 or exposed from the substrate 70), or any other suitable indicators. The treatment can be verified in response to determination of exposed roots, determination that less than a threshold percentage or number of roots are left in the undisturbed or retained substrate 70, determination that a predetermined substrate mass has been displaced, or determination of any other suitable indication of plant displacement. The indicator values are preferably measurements for the displacement indicators, but can alternatively be any other suitable measure. Displaced substrate and/or root exposure can be identified in an optical image based on color, profile, and object differentials between the second measurement and the first measurement, detected colors, or any other suitable parameter.

In a second example of the method, the treatment is plant cauterization. Determining the verification indicator value includes analyzing the second measurement for cauterization indicators. Cauterization indicators can include color change (e.g., difference between the first measurement and second measurement), detected colors (e.g., brown or black on the cauterized plant portion), detected color ratios (e.g., ratio of brown to green), color or color ratio changes, detected plant portion temperatures over a predetermined temperature threshold, temperature change, plant structure (e.g., cellular structure or external structure), plant structure change, the water content of the plant portion, water content change, or any other suitable parameter indicative of cauterization. The indicator values are preferably measurements for the cauterization indicators (e.g., the temperature of the plant, the percentage of a given hue, the intensity of a given hue, etc.), but can alternatively be any other suitable measure.

In a third example of the method, the treatment is working fluid application (e.g., growth hormone application, growth retardant application, etc.). Determining the verification indicator value includes analyzing the second measurement for fluid application indicators. Fluid application indicators can include detecting dye colors in an optical image (e.g., wherein the working fluid includes a colored, fluorescent, or other dye), detecting fluid beads or pools on the plant portion, detecting a spray blockage pattern or shadow on the substrate (e.g., substrate color change), detecting an increase in humidity levels proximal the plant portion, or detecting any other suitable parameter indicative of fluid application to the plant portion. The indicator values are preferably measurements for the fluid application indicators (e.g., humidity measurement, number of fluid beads, estimated volume of fluid retained on the plant, etc.), but can alternatively be any other suitable measure.

The reference indicator value can be predetermined, dynamically determined (e.g., based on the dynamically determined desired treatment effect on the plant), or otherwise determined. In one variation, the reference indicator value is retrieved from on-board or remote storage. The reference indicator values can be binary (e.g., either the treatment was applied and/or effective or was not), such as a threshold value. Alternatively or additionally, the reference indicator values can be a set of values (e.g., a plurality of values), wherein each value can be associated with a percentage, degree, or other measure of treatment success, efficiency, efficacy, or any other suitable measure of plant treatment. Alternatively or additionally, the reference indicator values can be a substantially continuous scale or be any other suitable set of values.

Verifying plant treatment S700 can additionally include adjusting the treatment mechanism operation parameters selected for subsequent treatment events based on the verification indicator value. This can function to provide feedback to the system to titrate (e.g., incrementally adjust) which treatment mechanism operation parameters are selected to obtain a desired result (e.g., target plant parameter). The future treatment mechanism operation parameters can be adjusted based on the verification indicator values extracted from the second measurement, or can be adjusted based on the actual or anticipated treatment effect on the plant based on the indicator values. The future treatment mechanism operation parameters are preferably adjusted for treatment of plants exhibiting similar parameters to the just-treated plant, but can alternatively be adjusted for treatment of plants in ambient environments having similar parameters as the ambient environment of the just-treated plant, or adjusted for treatment of plants based on any other suitable variable. The future treatment mechanism operation parameters are preferably changed from the set of treatment mechanism operation parameters selected for the just-treated plant, but can alternatively be used to adjust a formula, wherein the formula is subsequently used to determine the treatment mechanism operation parameters, or used to adjust the future selected treatment mechanism operation parameters in any other suitable manner. The future treatment mechanism operation parameters are preferably incrementally adjusted by a predetermined increment in response to determination that the treatment effect was not the desired effect, but the adjustment amount can alternatively be determined based on the indicator value, the difference between the determined indicator value and the reference indicator value, the difference between the actual and desired treatment effect, or determined in any other suitable manner.

In a first variation, the treatment is plant dislodgement, preferably by high-pressure spray but alternatively by mechanical digging or application of any other suitable dislodgement force. In response to determination that the treatment was less effective than desired (e.g., the percentage of the plant that was dislodged is less than the percentage of the plant that was targeted to be dislodged, roots were detected in the intact substrate when they should have been removed, etc.), for a second plant having plant parameters similar to the first plant (e.g., plant classification, plant maturity, etc.) and/or an ambient environment (e.g., substrate slope, substrate hardness, etc.) similar to the first plant, the depth, width, or distance of the dislodgement force application can be increased. The dislodgement force application parameters can be adjusted by increasing the spray duration, the spray pressure, the spray temperature, the spray profile, or any other suitable operation parameter. Conversely, the depth, width, or distance of the dislodgement force application can be decreased in response to determination that the treatment was more effective than desired (e.g., displaced more substrate than anticipated). However, the treatment mechanism operation parameters can be otherwise adjusted.

In a second variation, the treatment is plant cauterization, preferably by electric discharge application but alternatively by heat application or application of any other suitable electromagnetic wave. In response to determination that the treatment was less effective than desired (e.g., the recipient plant portion reflects green beyond a threshold hue or intensity, has a high ratio of green to brown hue, has a temperature lower than a temperature threshold, etc.), for a second plant having plant parameters similar to the first plant and/or an ambient environment similar to the first plant (e.g., soil conductivity, etc.), the electromagnetic parameter values of the treatment can be increased. Electromagnetic parameters that can be adjusted include the voltage, the current, the power input to the treatment mechanism, the electromagnetic wavelength, power provision duration, treatment mechanism position or orientation, or any other suitable electromagnetic parameter. Conversely, the electromagnetic parameter values of the treatment can be decreased in response to determination that the treatment was more effective than desired (e.g., cauterized more than the targeted plant portion, cauterized secondary plants as well, etc.). However, the treatment mechanism operation parameters can be otherwise adjusted.

In a third variation, the treatment is working fluid application to the plant, preferably by applying droplets to a portion of the plant but alternatively by brushing the working fluid on the plant or otherwise applying the fluid to the plant. In response to determination that the treatment was less effective than desired (e.g., the plant portion was inadequately covered, the plant portion retained less than a threshold or desired volume of the working fluid, an adjacent plant portion was affected, etc.), for a second plant having plant parameters similar to the first plant and/or an ambient environment similar to the first plant (e.g., wind speed, humidity, etc.), the fluid application parameter values of the treatment can be increased or adjusted. Fluid application parameters that can be adjusted include the spray pressure, the droplet charge, the droplet temperature, the droplet size, the position (e.g., height, angle, etc.) of the nozzle 211 during treatment, the actuation speed and/or angle of the nozzle 211 during treatment, the spray pattern 212, or any other suitable operation parameter. Conversely, the fluid application parameters can be decreased in response to determination that the treatment was more effective than desired (e.g., too much fluid was retained by the plant portion, the plant portion and an adjacent plant or plant portion were both treated, etc.). However, the treatment mechanism operation parameters can be otherwise adjusted.

a. Indirect Treatment of Secondary Plants

The method can additionally include determining the effects of primary plant treatment on secondary plants S800 within the geographic area (e.g., indirect treatment of secondary plants 50). Conversely, the method can include determining the treatment or operation parameters based on an amount of indirect treatment on the plant due to treatments of secondary plants 50 within the geographic area. The effects of primary plant treatment on secondary plants 50 are preferably considered when determining the target parameter for a plant, selecting the treatment for the plant (e.g., in response to receipt of the first measurement and prior to receipt of a second measurement for a second plant of the plurality, prior to processing the second measurement for the second plant of the plurality, etc.), selecting the treatment mechanism operation parameters selected for the plant (e.g., in response to selection of an action or treatment for a plant), and/or determining any other suitable treatment parameter. More preferably, the effects of primary plant treatment on secondary plants 50 functions as a variable that is considered when optimizing the geographic area output parameter. The effects that are considered can include the amount of indirect application of the primary plant treatment to the secondary plant, the mechanical effect on the secondary plants 50 (e.g., whether a dislodged plant will topple the secondary plant), the chemical effect on the secondary plants 50 (e.g., the nutrients that will be released due to primary plant necrosis), the disease and/or pest transmission effect on the secondary plants 50 (e.g., whether primary plant necrosis will result in disease and/or pest transmission to the secondary plant, such as due to increased physical proximity, etc.), or include any other suitable effect that affects geographic area output.

In a first example, the method includes iteratively determining the treatment and/or treatment mechanism operation parameters. Iteratively determining the treatment and/or set of treatment mechanism operation parameters can include selecting a first treatment and/or set of treatment mechanism operation parameters for a primary plant 40, determining the effects of the treatment on a set of secondary plants 50, selecting a second treatment and/or set of treatment mechanism operation parameters, and determining whether the first or second treatment and/or set of treatment mechanism operation parameters results in an output optimizing the geographic area output parameter. The second treatment and/or set of treatment mechanism operation parameters can be selected based on the estimated number of adversely affected secondary plants 50 due to the first treatment and/or set of treatment mechanism operation parameters, the type of adverse effects on secondary plants 50, randomly generated, or otherwise determined. The second treatment and/or set of treatment mechanism operation parameters can be determined prior to primary plant treatment, can be determined after verification of primary plant treatment, can be determined in response to determination that the primary plant 40 was inadequately treated (e.g., the measured plant parameter values varied from the target plant parameter values by more than a threshold difference), or determined at any other suitable time.

Figure 21:
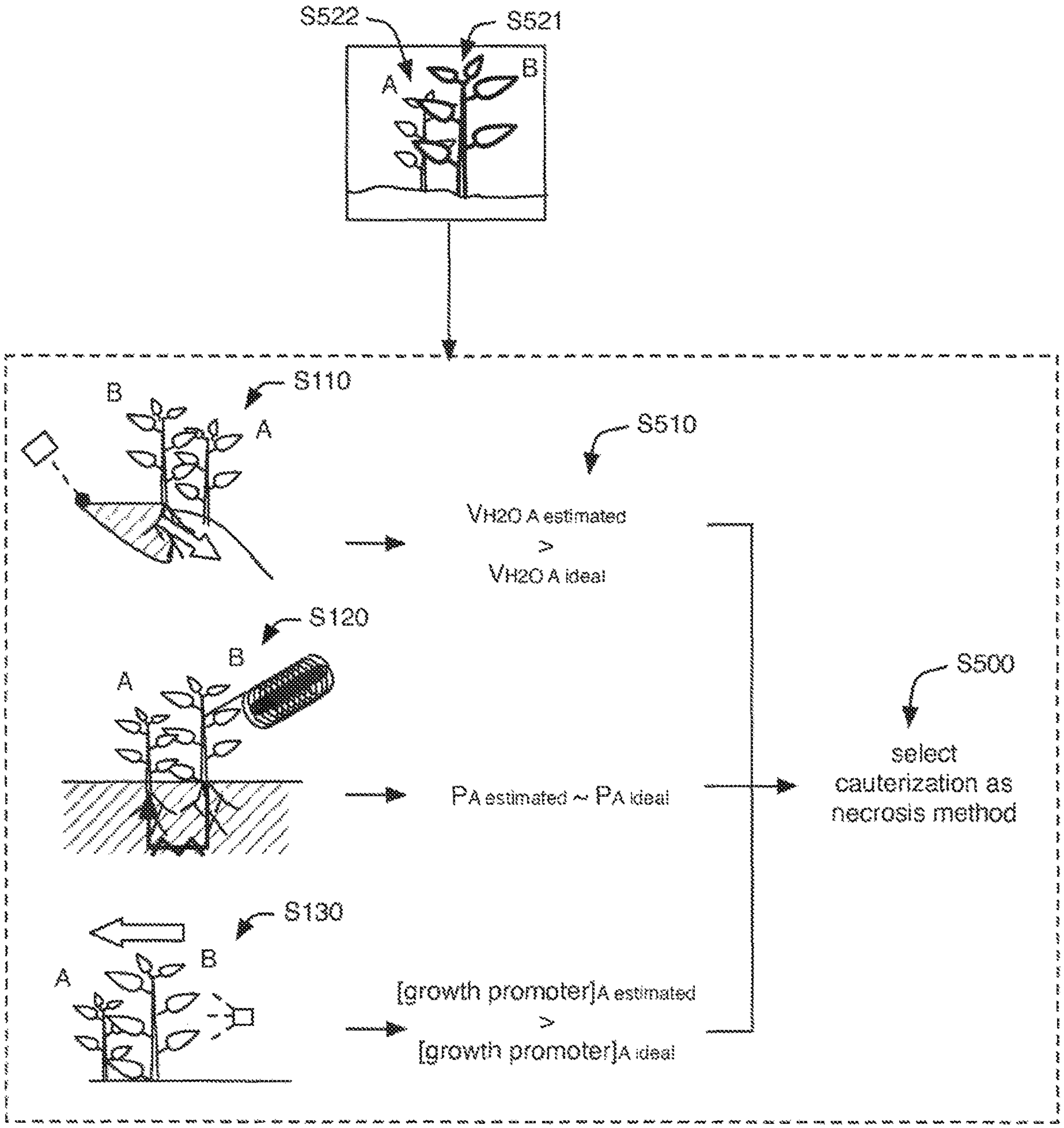
FIG. 21 is a schematic representation of treatment selection based on anticipated indirect secondary plant treatment.

In a second example, the method includes selecting the treatment and/or treatment mechanism operation parameters based on a parameter value. The parameter can be a plant parameter, ambient environment parameter, or any other suitable parameter. The treatment and/or set of treatment mechanism operation parameters can be selected from a chart, graph, or any other suitable database. For example, a first treatment and/or set of treatment mechanism operation parameters for the low-pressure spray mechanism can be selected in response to determination of a first ambient wind speed, while a second treatment and/or set of treatment mechanism operation parameters for the low-pressure spray mechanism can be selected in response to determination of a second ambient wind speed. In another example, as shown in FIG. 21, a treatment for a primary plant 40 can be selected by determining the treatments that can result in the target plant parameter value for the primary plant 40, determining the indirect treatment effects on secondary plants 50 for one or more of the treatments, comparing the indirect treatment effects to the target plant parameter values for each of the secondary plants 50, and selecting a treatment based on the comparison. The secondary plants 50 can be plants previously identified within the same treatment session (e.g., previously treated plants treated within a time window), plants previously identified in a prior treatment session (e.g., outside the time window) but unidentified during the instant treatment session, untreated plants, plants identified using a secondary detection mechanism (e.g., an airborne mechanism), or plants identified in any other suitable manner.

Determining the effects of primary plant treatment on secondary plants S800 within the geographic area preferably includes identifying a secondary plant S810. Secondary plants 50 are preferably plants within the geographic area or outside of the geographic area that could potentially experience all or a portion of the treatment applied to the primary plant 40 can be identified as a secondary plant. The secondary plants 50 are preferably associated with the primary plant 40 through an ambient environment feature. Ambient environment features are preferably characterized by ambient environment parameters. The ambient environment feature can be substantially permanent, such as a landform, or can be substantially transient, such as wind. When a secondary plant is determined based on a transient ambient environment feature, the ambient environment parameter values that are used are preferably those characterizing the ambient environment feature at the time of the treatment. The values of the ambient environment parameters can be retrieved from a database, measured, calculated based on historical information for the geographic area (e.g., soil conductivity determined based on past rainfall, watering, or other liquid treatments), or otherwise determined. Examples of ambient environment features include the geographic landform, distance (e.g., electric, geographic, etc.), the substrate 70, and wind, but any ambient environment feature can alternatively be considered. Examples of ambient environment parameters include the slope of the landform (e.g., gradient), the ambient environment electrical conductivity (e.g., soil conductivity), soil porosity, compaction, erosion, wind speed, and wind direction, but any parameter of any ambient environment parameter can alternatively be considered.

Figure 18:
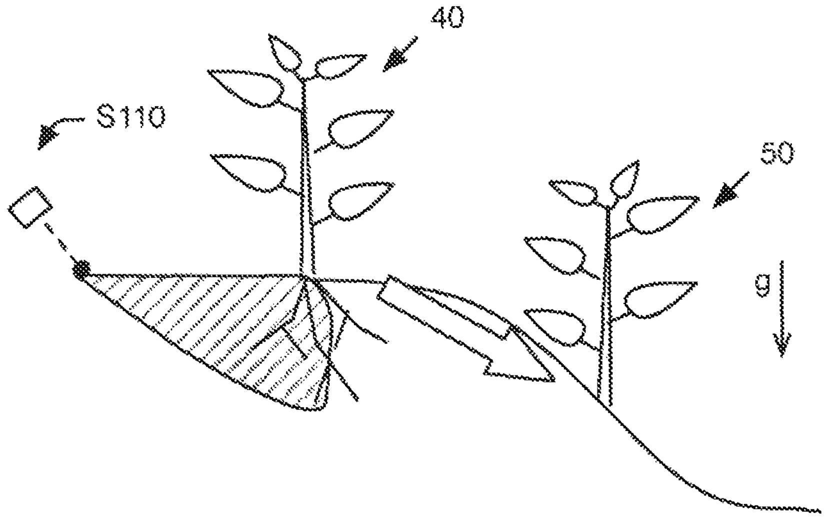
FIGS. 18, 19, and 20 are schematic representations of indirect treatments of secondary plants due to primary plant treatment for a first, second, and third treatment variant, respectively.
Figure 19:
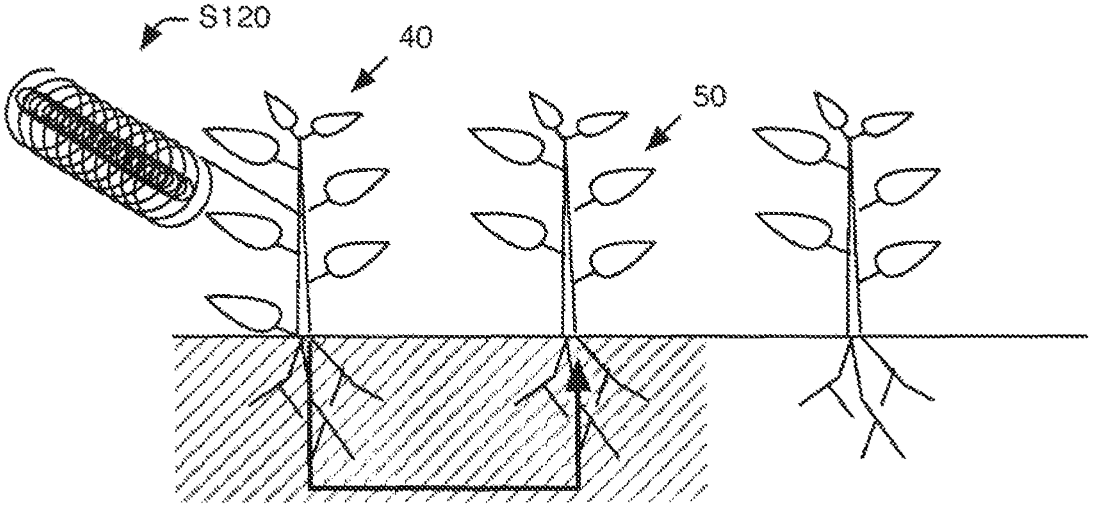
Figure 20:
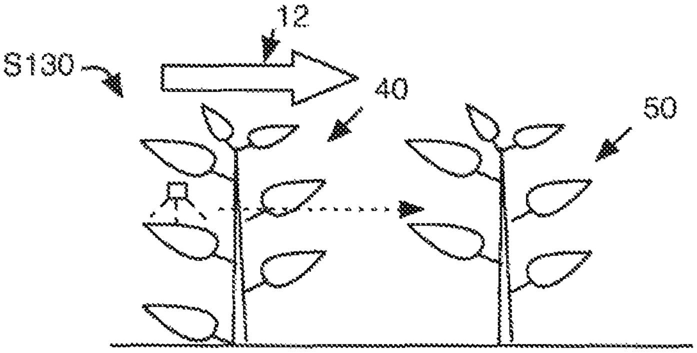

Examples of secondary plants 50 include plants that are located (e.g., positioned) inferior the primary plant 40 along a landform gradient (e.g., below the primary plant 40 relative to a gravity vector, as shown in FIG. 18), plants that are electrically connected to the primary plant 40 through the ambient environment (e.g., through the substrate, as shown in FIG. 19), and plants that are located along an ambient environment gradient or vector (e.g., downstream or downwind of the primary plant 40, as shown in FIG. 20). Alternatively, the secondary plants 50 can be plants located within a predetermined distance from the primary plant 40 (e.g., within 10 feet of the primary plant 40), or be any other suitable plant.

Determining the effects of primary plant treatment on secondary plants S800 within the geographic area preferably includes determining an amount of indirect treatment of a plant S820. Alternatively, determining the effects of primary plant treatment can include determining a probability of indirect treatment of a plant, a concentration of indirect treatment of a plant, a degree of indirect treatment of a plant, or determining any other suitable measure of indirect plant treatment. The determined amount of indirect plant treatment on a primary plant 40 is preferably stored in association with the plant, but can alternatively be determined for the purposes of treatment, treatment parameter, or other parameter selection only. In a first variation of the method, the amount of indirect plant treatment is determined in response to identification of a plant based on the first measurement. The amount of indirect plant treatment is determined based on previous treatments of secondary plants 50 in the field during the same session or within a time window. In a second variation of the method, the amount of indirect plant treatment on each of a set of secondary plants 50 is determined in response to primary plant treatment or treatment mechanism operation parameter selection, wherein the amount of indirect plant treatment on each secondary plant is preferably stored in association with the secondary plant. In this variation, the secondary plants 50 are preferably already known, either because the secondary plants 50 were plants previously treated within the same operation session 20, or because the secondary plants 50 were plants treated or otherwise identified in a prior operation session.

The amount of indirect treatment can be a projected amount of indirect treatment of a plant, based on a hypothetical set of treatment parameters, or can be an estimated, calculated, or measured amount of indirect treatment as a result of treating a first plant by operating the treatment mechanism in the treatment mode S400. The amount of indirect plant treatment can be determined based on a selected set of treatment mechanism operation parameters, based on a set of actual treatment mechanism operation parameters (e.g., the operation parameters at which the treatment mechanism was actually operated in the treatment mode), based on a set of measured treatment parameter values (e.g., measurements characterizing the treatment that was actually applied), or based on any other suitable treatment characterization. The amount of indirect plant treatment can additionally be determined based on a parameter of an ambient environment feature (ambient environment parameter).

In a first example, as shown in FIG. 18, the plant is dislodged using a high-pressure spray. The amount of working fluid (e.g., water) runoff to other plants is determined based on the volume of working fluid used to dislodge the plant (e.g., estimated or actual), the relative positions of the first and second plants on a slope, and the soil porosity and/or saturation at the treatment time.

In a second example, as shown in FIG. 19, the plant is cauterized using electrical discharge. The amount of electrical discharge applied to other plants is determined based on the amount of electricity applied to the primary plant 40 and the soil conductivity at the treatment time.

In a third example, as shown in FIG. 20, the plant is treated by applying a growth regulator to the plant. The amount of growth regulator applied to other plants is determined based on the duration of growth regulator spraying, the wind speed at the treatment time, and the wind direction at the treatment time.

In a first variation, the plant for which the indirect treatment is determined can be the plant instantaneously identified based on the first measurement (e.g., the plant for which the decisions are to be made). This variation is preferably utilized when determining a treatment and/or operation parameters for a plant, in response to identification of the plant. Determining the amount of indirect treatment of the plant includes determining an amount of indirect treatment of the plant based on prior treatments of secondary plants 50, wherein the primary plant 40 is inferior, downstream, or otherwise a recipient of a portion of secondary plant treatment. The primary plant 40 is preferably associated with the secondary plant based on an ambient environment parameter, more preferably the ambient environment parameter at the time of the prior treatment (e.g., the wind speed and direction during the prior treatment). The prior treatments of secondary plants 50 can be determined based on a set of stored operation parameters selected for the prior treatment, a set of operation parameters characterizing the actual treatment mechanism output for the prior treatment, a set of measurements characterizing the effect of the prior treatment (e.g., based on measurements obtained while verifying the treatment), or determined in any other suitable manner. The secondary plant was preferably treated at a prior time point, wherein the prior time point is preferably within a threshold time period of the instantaneous time (e.g., within the same treatment session, operation session, within a predetermined period of time such as a day, etc.). However, the secondary plant can be concurrently treated, as the amount of indirect treatment is being determined, or treated at any other suitable time.

The determined amount of indirect treatment is preferably used to adjust the treatment mechanism operation parameters selected for the first plant. For example, if plant displacement is selected for both the primary plant 40 and the secondary plant, the amount of water runoff to the primary plant 40 due to secondary plant treatment can be determined, the effect of the water runoff on the soil rigidity determined, and the spray duration adjusted based on the determined soil rigidity. In another example, if growth hormone application is selected for both the primary plant 40 and the secondary plant, the amount of growth hormone selected to be applied to the primary plant 40 is preferably discounted by the amount of indirect growth hormone applied due to secondary plant treatment. In another example, if electric discharge was selected for the secondary plant and growth stimulation is selected for the primary plant 40, the amount of electrical stimulation on the primary plant 40 due to secondary plant treatment is determined, the estimated amount of primary plant growth stimulation due to the determined amount of electrical stimulation is determined, and the treatment for the primary plant 40 selected accordingly. In particular, if the amount of electrical stimulation will result in the desired growth stimulation, then the plant is not treated. If the amount of electrical stimulation will result in insufficient growth stimulation, the already-applied electrical stimulation can be augmented with a direct treatment. If the amount of electrical stimulation resulted in an adverse result (e.g., necrosed the plant), the target plant parameter value (e.g., target effect) can be adjusted. In another example, if plant displacement using high-pressure spray was selected for the secondary plant and plant watering was selected for the primary plant 40, the amount of water to be directly applied to the primary plant 40 is discounted by the amount of water indirectly applied to the primary plant 40 (e.g., due to water runoff) from treatment of the secondary plant.

In a second variation, the plant for which the indirect treatment is determined can be a secondary plant that has not yet been identified in the instantaneous operation session (e.g., duration of continuous operation). Alternatively, the plant for which the indirect treatment is determined can be a secondary plant that has been previously identified and treated, wherein the effect of the indirect treatment is analyzed to determine whether the primary plant treatment will further or retard progress toward the target plant parameter value or target effect. However, the secondary plant can be concurrently treated as the amount of indirect treatment is being determined, or treated at any other suitable time. In this variation, a secondary plant is a plant that is located inferior, downstream, or otherwise a recipient of a portion of primary plant treatment. The secondary plants 50 are preferably plants assigned to be retained, but can alternatively be plants assigned for necrosis. This variation is preferably utilized when determining a treatment and/or operation parameters for a primary plant 40, in response to identification of the plant. This variation can function to consider the effects of the treatment on other plants, before the treatment is applied. In this variation, determining the effect of the primary plant treatment on secondary plants 50 includes determining the indirect treatment to be applied to each secondary plant for a considered treatment, determining an effect of the respective portion of the primary plant treatment on each secondary plant, and, for each secondary plant, comparing the effect of the respective portion of the primary plant treatment on each secondary plant with the target plant parameter value for each secondary plant, wherein the target plant parameter value is preferably selected to optimize the geographic area output parameter.

In one example, when the considered treatment is high volume working fluid application (e.g., plant dislodgement using high-pressure spray), the method includes determining an amount of working fluid estimated to be applied to each secondary plant and/or determining an amount of nutrients estimated to be applied to each secondary plant due to first plant necrosis, determining the effect of applying this amount of working fluid and/or nutrients to the secondary plant, and selecting the treatment in response to determination that the additional working fluid and/or nutrients will assist secondary plant growth to achieve the respective target plant parameter. Alternatively, the method includes determining an estimated first volume of water to be output during the spray duration; determining a target plant parameter value for each plant of the set by optimizing the plant output parameter for the geographic area S510; determining a target volume of water for each plant of the set based on the respective target plant parameter; determining a second volume of water subsequently available to each of a set of secondary plants 50 anticipated to be affected by a portion of the first volume of water; for each plant of the set, comparing the second volume of water with the target volume of water; and selecting the spray duration in response to determination that the second volume of water is less than, equal to, or more than (within a predetermined volume threshold) the target volume for more than a threshold number of secondary plants 50, or selecting the spray duration in response to any other suitable decision threshold being met. The second volume of water can be estimated based on the portion of first volume of water, an amount of water instantaneously available to the secondary plant (e.g., based on historical water application to the plant, such as due to rainfall, direct watering, runoff from treatment of other plants, etc.), and an anticipated amount of water to be applied in the future (e.g., due to forecasted rainfall, watering based on a known schedule, runoff from anticipated treatment of other plants, etc.). However, the second volume of water can be determined in any other suitable manner.

In another example, when the considered treatment is plant necrosis by electrical discharge, the method includes determining the estimated stimulation effect of the electric discharge on a growth parameter of each of a set of secondary plants 50, which can include determining an amount of secondary electrical discharge estimated to be applied to each secondary plant due to the proposed electrical discharge parameters and the soil conductivity and determining the effect of applying the secondary electrical discharge to the secondary plant. The effect of the secondary electrical discharge on the entire plant or on a growth parameter of the plant can be determined. The effect of the electrical discharge on a secondary plant is preferably determined based on the proposed electrical discharge parameters and the soil conductivity, but can alternatively or additionally be based on the atmospheric conductivity, resistivity, or any other suitable parameter. An electrical discharge parameter (e.g., the voltage, current, or treatment time) can be selected in response to determination that the secondary electrical discharge will affect the secondary plant. In particular, an electrical discharge parameter that optimizes the geographic area output parameter (e.g., based on the target growth parameter for the secondary plant) can be selected, calculated, or otherwise determined based on the estimated stimulation effect. Alternatively, a predetermined set of electrical discharge parameters can be adjusted in response to determination of adverse affects on a threshold proportion of secondary plants 50. For example, an electrical discharge parameter can be lowered in response to determination that the secondary electrical discharge will adversely affect the secondary plant. Alternatively, a different treatment method for the primary plant 40 can be selected in response to determination that the secondary electrical discharge will adversely affect the secondary plant.

In another example, when the considered treatment is plant growth regulation by spraying a growth regulator (e.g., growth hormone or fertilizer) on the primary plant 40, the method includes determining an amount of the growth regulator that will be applied to each secondary plant, based on the magnitude of the wind and the concentration of the growth regulator spray. The treatment and associated operation parameters are selected in response to determination that the secondary plants 50 are to be necrosed, have been necrosed, or will positively benefit from the indirect application of growth regulator. In response to determination that the secondary plants 50 will be adversely affected by the considered treatment, a second treatment can be selected or the treatment mechanism operation parameters adjusted. For example, the droplet charges can be increased (e.g., thereby generating a stronger electric field that prevents droplet drift toward the secondary plant), the spray angle or position changed to be upwind of the primary plant 40, the droplet size increased, the growth regulator concentration in the working fluid lowered, or the operation parameters adjusted in any other suitable manner.

The combined effects of treatments on multiple plants can additionally be considered for a given plant. For example, if plant necrosis by electrical discharge was being considered for the primary plant 40 and plant displacement using high-pressure spray was used on a first, previously treated secondary plant 20, the effect of the electrical discharge on a third plant due to increased soil conductivity can be determined and used in determining whether primary plant necrosis should be achieved using electrical discharge. In another example, if growth regulation by spraying a growth regulator was selected for a first and a second plant and growth regulation by spraying a growth regulator is being considered for a third plant, the combined effects of indirect growth regulator application due to treatment of the first, second, and third plants on a fourth plant can be determined and used in determining whether primary plant growth regulation should be achieved using growth regulator application. However, the indirect effects of primary plant treatment can be otherwise determined and utilized.

b. Plant Dislodgement or Plant Portion Removal

Figure 9A:
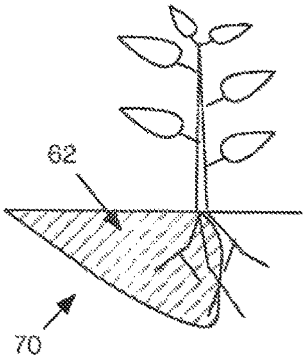
FIGS. 9A, 9B, and 9C are schematic representations of a first, second, and third example dislodgement profile, respectively.
Figure 9B:
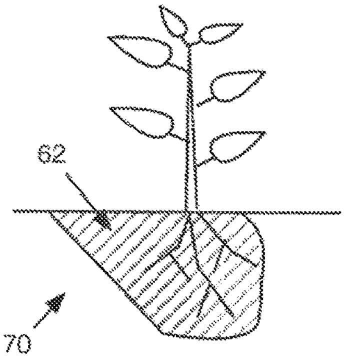
Figure 9C:
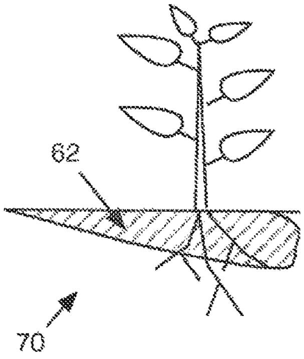

In a first variation of the method, the plant treatment includes dislodging the plant from the substrate 70 (e.g., soil) S110 by displacing the supporting substrate from underneath the plant (e.g., by digging out the plant). The plant can be dislodged by displacing most of the substrate under the plant stem, displacing most of the substrate to which the roots are attached (e.g., remove the substrate from the roots), displacing most of the substrate under the roots (e.g., dig underneath the roots), or displacing any other suitable volume of substrate. The depth of the substrate displacement is preferably deeper than the root depth, as shown in FIGS. 9A and 9C, but can alternatively be shallower than the root depth (e.g., and either expose the root(s) or sever the root(s)), as shown in FIG. 9B, or equivalent to the root depth. The root depth can be the actual root depth, an estimated root depth, or any other suitable depth. The distance of substrate displacement is preferably at least half the root lateral span (e.g., such that the plant is unbalanced and falls over due to the plant mass), as shown in FIG. 9A, but can alternatively be less than half the root lateral span, more than the root lateral span, as shown in FIG. 9B, or be any other suitable distance. Alternatively, the depth and distance of the substrate displacement can be predetermined, selected based on the measurement, static, or determined in any other suitable manner. The substrate 70 can be displaced by high-pressure working fluid application, such as of water or air, but can alternatively be displaced by a digging mechanism (e.g., a shovel or spade), or any other suitable substrate displacement mechanism.

Dislodging the plant S110 preferably includes applying a dislodging force to the substrate surrounding the plant. The dislodging force can be applied by a high-pressure spray mechanism, a digging force applicator (e.g., a shovel), or any other suitable force applicator. The high-pressure spray mechanism preferably applies a high-pressure spray of working fluid, wherein the working fluid can be water, air, or any other suitable working fluid. The method can additionally include pressurizing the working fluid to a spray pressure. The spray pressure is preferably constant throughout system operation, but can alternatively be variable dependent upon the treatment parameters. The method can additionally include mixing additives into the working fluid to obtain a predetermined concentration.

Dislodging the plant S110 preferably includes identifying a plant within a geographic area S100, identifying a plant feature for use in treatment application S200, determining a set of operation parameters for a treatment mechanism S300, and operating the treatment mechanism in the treatment mode S400. More preferably, dislodging the plant S110 includes identifying a plant within a geographic area S100; identifying a plant feature S200, including identifying a junction 60 between a plant stem and a substrate supporting the plant; determining a junction distance; determining a set of operation parameters for a treatment mechanism S300, including determining an initial spray parameter based on the junction distance; and operating the treatment mechanism in the treatment mode S400 in response to satisfaction of the initial spray parameter.

The inventors have discovered that increased displacement distances can be achieved with increased continuous or substantially continuous spray time, using the same pressure, even as the active area (e.g., sprayed area) is moving. This is because once an initial crack is formed in the substrate 70, the substrate 70 adjacent the crack is weakened and is displaced more easily with application of the same force. In operation, the further away the plant junction 60 is from the system traversal path, the earlier and/or further away from the junction 60 the system should begin spraying. Alternatively, the further away the plant junction 60 is from the system travel path, the longer the system should spray.

Identifying a junction 60 between a plant stem and a substrate 70 supporting the plant functions to identify a plant feature that functions as a reference point from which a spray duration and/or spray position can be determined. The junction 60 is a plant feature, wherein the junction 60 is identified in a similar manner in which the plant feature is identified, as discussed above. In particular, processing the image to identify the junction 60 can include extracting a ground plane from the image, and identifying a plant stem (plant support structure) proximal the sensor within the image, and identifying the junction 60 between the plant stem and the ground plane (e.g., based on distance analysis, color analysis, pattern analysis, etc.). The junction 60 is preferably identified in a measurement of the geographic area that includes the junction 60 (e.g., interface between the plant stem and the substrate 70). In one variation, the measurement is an optical image captured at an angle between a vector parallel to the substrate surface and a normal vector to the substrate surface. However, the measurement can be any other suitable measurement.

Determining a junction distance functions to determine a geographical distance between the plant, more preferably the junction 60, and an anticipated position of a treatment mechanism. The anticipated position of the treatment mechanism is preferably determined based on the traversal path for the treatment mechanism, wherein the anticipated position of the treatment mechanism can be the geographic location at which a tangent to the traversal path is substantially aligned with the plant junction 60. Alternatively, the anticipated position of the treatment mechanism can be the geographic location at which the active area is closest to the plant junction 60. The treatment mechanism is preferably angled perpendicular to the system traversal vector, wherein the active area is substantially aligned with the junction 60 at the anticipated position, but can alternatively be arranged at an angle relative to the system traversal vector, wherein the anticipated position of the treatment mechanism is further dependent upon the treatment mechanism angle. However, the anticipated position of the treatment mechanism can be determined in any other suitable manner. The anticipated position is preferably determined based on an instantaneous system traversal vector (treatment mechanism traversal vector, sensor traversal vector, etc.), but can alternatively be determined based on a predetermined traversal path (e.g., pre-programmed path for the system), a geographical feature (e.g., a road or furrow, as determined based on the instantaneous system position and a map, satellite views, and/or user entries), or based on any other suitable position parameter.

However, the junction distance 61 can be determined in any other suitable manner. For example, the junction distance 61 can be determined based on the geographic location associated with the plant feature measurement (e.g., the geographic location at which the plant feature measurement was taken), the detection mechanism angle relative to the system traversal vector, the system traversal vector magnitude (e.g., system velocity) and the distance between the junction 60 and the detection mechanism 100. The distance between the junction 60 and the detection mechanism 100 can be determined from the plant feature measurement (e.g., using a stereoview), from a distance measurement (e.g., LIDAR), using known marker size comparisons, from the instantaneous system geographic location and an estimated or known plant geographic location, or determined in any other suitable manner. In another example, determining the junction distance can include extracting a preliminary distance between the sensor and the plant and determining the junction distance based on the preliminary junction distance 61 and a predetermined distance between the first sensor and the treatment mechanism. Determining the junction distance can further include correcting the preliminary junction distance 61 based on the system velocity.

Alternatively, the high-pressure spray mechanism can be used to remove a portion of the plant. In this specific variation, the method can include identifying a portion of the plant to be removed (e.g., wherein the identified plant portion is diseased, too close to a neighboring plant portion or plant, or has any other suitable characteristic), and operating the treatment mechanism in the treatment mode (e.g., high pressure spray mode) to remove the plant portion. The treatment mechanism operation parameters, such as the pressure and duration, are preferably selected based on the parameters of the plant portion to be removed or affected by the applied force. For example, higher pressures can be used to cut thicker plant stems.

Determining an initial spray parameter based on the junction distance 61 functions to determine when and/or where the system should start spraying. The initial spray parameter is preferably determined when the treatment mechanism is statically mounted (e.g., fixed) relative to the mounting mechanism and/or emits working fluid at a substantially constant pressure (e.g., non-variable or adjustable). Varying excavation distances relative to the system can be achieved by varying the spray duration, even though the working fluid is sprayed at the same area relative to the system. The initial spray parameter can be an initial spray time, an initial spray position, or any other suitable spray parameter. The initial spray parameter is preferably determined based on a spray duration. The initial spray time can be the estimated time at which the treatment mechanism will be located at the anticipated position, less the spray duration. For example, if the spray duration is 10 seconds, then the treatment initiation time is 10 seconds before the treatment mechanism is aligned with the plant junction 60. The initial spray position can be the position at which the system must begin spraying in order to spray for the spray duration, given the system velocity.

The spray duration is preferably determined based on the spray pressure (e.g., predetermined, measured, or anticipated) and the junction distance 61, wherein the spray is preferably sufficient to excavate or displace substrate at or proximal the junction 60 after spraying for the spray duration. The spray duration can additionally be determined based on the ambient environment parameters, such as soil saturation, soil looseness or compactness, soil porosity, soil rigidity, soil retention rate, soil erosion, wind speed, wind direction, humidity, or any other suitable ambient environment parameter. For example, the spray duration can be increased for harder or more compacted soil, dryer environments, or higher wind speeds. The ambient environment parameter can be retrieved, determined based on historical records generated within a time window of the instantaneous time (e.g., based on historical rainfall and watering patterns), determined based on historical records associated with the geographical location of the geographic area, determined based on substantially instantaneous measurements, or determined in any other suitable manner. Alternatively, the spray duration can be determined by estimating an amount of substrate to be removed based on the junction distance 61 (e.g., the distance from the traversal path, the depth and shape of the trench 62, etc.) and estimating an amount of removal time (the spray duration) based on the amount of substrate to be removed and the pressure. The spray duration can be predetermined, selected from a chart or graph, calculated, or otherwise determined.

Operating the treatment mechanism in the treatment mode S400 in response to satisfaction of the initial spray parameter functions to spray the geographic area for a long enough time, such that the plant is at least partially dislodged. The system preferably translates along the traversal path during treatment mechanism operation in the treatment mode (e.g., as the system sprays), but can alternatively stop and remain static. The system translation rate is preferably the same rate as when the treatment mechanism was in the standby mode, but can alternatively be a different rate. Operating the treatment mechanism in the treatment mode S400 preferably includes spraying the active area with a continuous or intermittent stream of pressurized working fluid.

Operating the treatment mechanism can additionally include selecting treatment mechanism operation parameters. The operation parameters are preferably selected based on the junction distance 61, but can alternatively or additionally be selected based on the system velocity, ambient environment parameters, plant parameters, or any other suitable information. The operation parameters can include the spray duration, initial spray time, initial spray position, spray pressure, spray temperature, spray charge, spray composition, or any other suitable operation parameter. The operation parameters can additionally include the spray pattern 212. The spray pattern 212 can be constant, vary with time or proximity to the plant, or vary in any other suitable manner. In one variation of the method, the selected spray pattern 212 changes from a solid stream, to create a crack in the substrate 70, to a flat spray pattern that removes a larger area of substrate 70. In another variation, the selected spray pattern 212 is maintained as a solid stream to dig deeper into the substrate 70. The system velocity can be varied to accommodate the spray pattern 212. The spray pattern 212 is preferably selected based on the desired function, wherein the desired function can be determined based on the ambient environment parameters (e.g., soil hardness, etc.) and/or plant parameters (e.g., root depth, root thickness, root spread, etc.). For example, a first spray pattern (e.g., a wide spray pattern) can be selected for plants having fibrous roots and a second spray pattern and/or spray duration selected for plants having tap roots. When the operating parameters are selected based on the plant parameters, the method can include classifying the plant, estimating a plant root depth based on the classification, determining an amount of substrate to be removed based on the plant root depth, and determining an amount of removal time (spray duration) such that a resultant depth of the substrate to be removed is at least a predetermined percentage (e.g., 10%, 50%, 90%, etc.) of the plant root depth. In another example, a first spray pattern (e.g., cone spray pattern, tight spray pattern, etc.) can be selected to cut, sever, or otherwise apply a mechanical force to a plant portion.

Alternatively or additionally, the method can include selecting a spray angle for the nozzle 211. This can be particularly desirable when the nozzle 211 is actuatable about a rotational axis. The rotational axis is preferably oriented parallel the mounting mechanism longitudinal axis, but can alternatively be perpendicular the mounting mechanism longitudinal axis or arranged in any other suitable manner. The selected spray angle is preferably based on the junction distance 61, with larger angles selected for larger distances, but can alternatively or additionally be determined based on the instantaneous or anticipated working fluid pressure, based on the ambient environment parameters (e.g., wind speed), or determined in any other suitable manner. The method can additionally include translating the system to align the active area with a treatment position. For example, the system can automatically deviate from the traversal path in a direction toward the junction 60 in response to detection of a junction distance 61 beyond a threshold distance. The system can automatically recover the traversal path after plant treatment. However, the treatment mechanism operation parameters can be otherwise selected.

c. Plant Cauterization

In a second variation of the method, the plant treatment includes cauterizing the tissues of a plant section. The plant that is cauterized is preferably below a threshold size (e.g., threshold mass, height, stem thickness, etc.), such as below 10 cm, 5 cm, 1 meter, or any other suitable threshold, but can alternatively be any size. The plant can be cauterized by applying high voltage electric power to the plant, by applying a heating element to the plant, or cauterized in any other suitable manner. The cauterization preferably changes the plant cell structure (e.g., ruptures or otherwise changes the cell structure), such that nutrient and/or water transfer beyond the cauterized section is hindered or prevented, but cauterization can otherwise affect the plant. After cauterization, the plant portion distal the plant stem or root system, beyond the cauterized section, preferably necroses (e.g., dies). However, the probability of plant portion necrosis is preferably related to the degree of section cauterization, wherein plant cauterization beyond a threshold degree (e.g., section cauterization length, section cauterization depth, temperature increase, etc.) preferably corresponds with a high probability of plant portion necrosis, and plant cauterization lower than the threshold degree is preferably associated with lower probabilities of plant necroses with lower degrees of plant cauterization.

For these reasons, cauterization by electric discharge can be more efficacious than direct heat application (e.g., RF heat application). The inventors have discovered that applied electric discharge will affect (e.g., cauterize) the plant section 90 having the highest electric resistance located between the discharge application point and electrical ground (e.g., the substrate 70). This section 90 can be the thinnest section of the plant (e.g., the portion of the plant having the smallest cross-section), the densest section of the plant, or a previously fully or partially cauterized section of the plant, or have any other suitable characteristic. This results in cauterization of a plant cross-section, thereby creating a nutrient and water blockage in the fluid path between the root and/or stem system and the plant portion to be necrosed. The thinnest portion of the plant can be a portion of the stem, a junction 60 between the stem and the root, a root, an internode, an axil between a lateral shoot and the stem, a petiole, a flower stalk, or any other suitable portion of a plant. In operation, electric discharge applied to a portion of the plant will travel along the plant, toward electrical ground, which can be the substrate 70, a grounding electrode applied to the plant by the system, or any other suitable electrical ground. More preferably, the electric discharge will travel along the plant toward the root system, which is connected to the substrate 70, and will cauterize the thinnest plant section along that path. Furthermore, plant growth can be stimulated by small doses of electric discharge application. Therefore, plant cauterization through electric discharge application can additionally minimize adverse treatment effects on adjacent plant portions and/or plants electrically connected to the treated plant.

Cauterizing the plant S120 preferably includes identifying a plant within a geographic area S100, identifying a plant feature for use in treatment application S200, determining a set of operation parameters for a treatment mechanism S300, and operating the treatment mechanism in the treatment mode S400. More preferably, cauterizing the plant S120 includes identifying a plant, in-situ, within a geographic area; determining a set of operation parameters for a treatment mechanism S300, including selecting a treatment position on the in-situ plant for electric discharge application, wherein selecting the treatment position includes identifying a plant feature S200, wherein identifying the plant feature includes determining a plant cross-section, more preferably a high-resistance cross-section (e.g., relative to the remainder of the plant); and applying electric discharge to the treatment position by operating the treatment mechanism in the treatment mode S400. The method can additionally include determining a portion of the plant to be necrosed, prior to treatment position selection.

Determining a portion of the plant to be necrosed can include determining to necrose the entirety of the plant or determining to necrose a portion of the plant. Determining to necrose a portion of the plant can additionally include identifying a specific portion of the plant to necrose (e.g., a side of the plant, a branch of the plant, a fruit of the plant, etc.). The determination is preferably based on the geographic area output parameter maximization, as discussed above, but can alternatively be based on an instantaneous measurement of plant health, plant portion health, or based on any other suitable parameter. For example, a plant branch proximal a secondary plant can be identified for plant necrosis in response to determination that the plant branch will crowd (e.g., impede growth of) the secondary plant.

Selecting a treatment position on the in-situ plant for electric discharge application functions to select a treatment position on the plant that will result in electric discharge concentration at a plant cauterization section, wherein cauterization of the plant cauterization section substantially isolates or otherwise decreases nutrient communication between the plant portion identified for necrosis and the remainder of the plant. The treatment position is preferably selected based on a plant cross-sectional dimension (e.g., a plant feature). More preferably, the treatment position is selected based on the location of a local minima, wherein the plant section is arranged along the plant, between the root system and the plant portion to be necrosed. The local minima is preferably the plant section having the smallest or narrowest cross-sectional dimension of the plant that is located in an intermediary plant section between the root system and/or electrical ground and the plant portion to be necrosed, but can alternatively be a section of the intermediary plant section having a cross-sectional dimension less than a threshold dimension, or be determined in any other suitable manner. The local minima is preferably determined from analysis of a measurement or a combination of multiple measurements recorded concurrently or asynchronously. The measurement can be the first measurement, or can be a second measurement. The measurement can be a stereoview, single view, multispectral measurement, LIDAR measurement, or any other suitable measurement. The selected treatment section is preferably located along the plant portion to be necrosed, distal the plant portion to be retained across the local minima plant section from electrical ground. However, the treatment section can be any other suitable section.

Alternatively, the treatment position can be determined iteratively. For example, a first treatment position can be selected, and the method can include adjusting the treatment position in response to determination of a second plant portion between the first treatment position and the junction having a cross section with a smaller dimension than the plant portion to be necrosed. However, the treatment position can be selected in any other suitable manner.

In one variation, the entire plant is to be necrosed. The selected treatment position is preferably based on the narrowest plant section, most proximal the plant root system. Alternatively, the selected treatment position can be a thick portion of the stem proximal the plant root system (e.g., proximal the substrate 70), with no intermediary plant sections that are narrower than the treatment position. Alternatively, the selected treatment position can be any other suitable position on the plant or in the ambient environment proximal the plant. Selecting the treatment position can include identifying a section of the plant stem, more preferably a section of the plant stem contiguous with a substrate 70 supporting the plant; estimating a cross-sectional minima of the section; and selecting a treatment position on the plant for electric discharge application, the treatment position located between the cross-sectional minima of the section and the substrate 70.

In another variation, a portion of the plant is to be necrosed, such as a branch, fruit, or other portion. The selected treatment position is preferably based on the narrowest plant section between the plant portion to be necrosed and the plant portion to be retained. The selected treatment position is preferably on the plant portion to be necrosed, but can alternatively be on any other suitable plant portion. Alternatively, the selected treatment position can be any other suitable position on the plant or the ambient environment. Selecting the treatment position can include identifying a plant section electrically arranged between the plant portion to be necrosed and electrical ground, the plant section having a cross-sectional dimension smaller than a cross-sectional dimension of a second plant portion determined for retention, the second plant portion electrically arranged between the plant section and the substrate 70; and selecting a position on the plant, opposing the second plant portion across the plant section, as the treatment position.

Figure 22A:
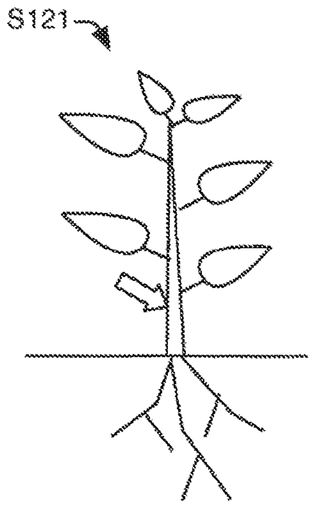
FIGS. 22A and 22B are schematic representations of: creating a high resistance plant section by reducing the cross-section of the plant section; and applying electric discharge to a plant portion distal electric ground, across from the plant section, respectively.

The method can additionally include creating a local minima on the plant, as shown in FIG. 22A. The local minima is preferably created after determining a portion of the plant to be necrosed, but can alternatively be created at any other suitable time. The local minima is preferably created in response to determination that the intermediary plant portion between the plant portion to be necrosed and the electric ground lacks a local minima, but can alternatively be created for every cauterization or created in response to any other suitable event. Creating the local minima preferably includes identifying an intermediary plant portion, selecting a plant section within the intermediary plant portion, and reducing the cross section of the selected plant section S121. The selected plant section is preferably a plant section that is easily accessible to the system (e.g., accessible without damaging other plant portions), but can alternatively be any other suitable plant section. Reducing the cross section can include cutting the plant section, knicking the plant section, or otherwise reducing the cross section. Alternatively, the method can include increasing the resistivity of the plant section instead of reducing the cross section, such as by cauterizing the plant section with a first line or point cauterization mechanism (e.g., by using RF heat or microwave heat). The local minima can be otherwise created.

Figure 22B:
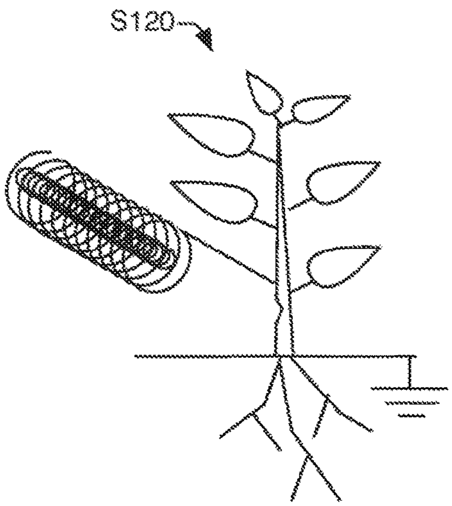

Applying electric discharge to the treatment position functions to cauterize the plant section. Applying the electric discharge to the treatment position can include positioning a treatment mechanism at the treatment position electrically distal electrical ground, with the plant section (e.g., local minima) located between the application position and electrical ground, and operating the treatment mechanism in the treatment mode S400, as shown in FIG. 22B. In one variation, the treatment mechanism is a Tesla coil 240 with an applicator wire, wherein positioning the treatment mechanism includes mechanically coupling the applicator wire to the treatment position. In another variation, the applicator wire can be retained within a predetermined distance of the treatment position (e.g., 1 cm away, 1 mm away, etc.). In another variation, the treatment mechanism includes a first and second electrode, wherein the electric discharge is generated between the first and second electrodes. In this variation, positioning the treatment mechanism includes arranging the first and second electrodes on opposing sides of the treatment position on the plant. However, the treatment mechanism can be any other suitable mechanism and positioned in any other suitable position.

Operating the treatment mechanism in the treatment mode S400 preferably includes providing sufficient power input to achieve a set of treatment parameters. The treatment parameters can be predetermined or dynamically determined. The treatment parameters can include the electric discharge voltage, the electric discharge current, the duration of electric discharge application, or any other suitable electric discharge parameter. In one variation, operating the treatment mechanism in the treatment mode S400 includes emitting electric discharge at 50 kV or higher. However, the electric discharge can be emitted at any other suitable voltage. The electric discharge current is preferably low (e.g., 1 mA, 1A, 10A, etc.), but can alternatively be high (e.g., 100A), or any other suitable current magnitude.

In a second variation, the method can include determining the set of electric discharge parameters based on a translation velocity of a treatment mechanism configured to emit the electric discharge. In particular, the electric discharge current can be selected based on the system translation velocity, wherein higher currents are selected for faster velocities, and lower currents are selected for slower velocities. However, the electric discharge voltage, electric discharge application duration, or any other suitable parameter can be selected based on the translation velocity.

In a third variation, the method can include determining the set of electric discharge parameters based on ambient environment parameters. Determining the set of electric discharge parameters based on ambient environment parameters can include determining the set of electric discharge parameters based on an electrical conductivity of the substrate 70 and target growth parameters for secondary plants 50 within the geographic area that are electrically connected to the plant, as discussed above. However, the set of electric discharge parameters can be determined in any suitable manner.

Alternatively, the treatment can be applied to a geographic region, more preferably a geographic region within the geographic area, wherein all plants are to be treated with the same treatment. For example, all plants in geographic region can be necrosed (e.g., the furrow between the crop rows). In this variation, the method can include identifying a geographic region for cauterizing treatment application, and in response to collocation the active area of the electric discharge mechanism and the geographic region, operating the electric discharge mechanism in the treatment mode based on a set of operation parameters, wherein the operation parameters are selected based on a system parameter. The geographic region can be a region predetermined to have all or most (e.g., 90%, 70%, etc.) of the plants necrosed, a set of substantially continuous plants identified to be necrosed, or any other suitable geographic region. The active area is preferably the area to which the electric discharge is applied by the electric discharge mechanism. The electric discharge mechanism is preferably operated in the treatment mode when the active area is aligned with or within the geographic region, and preferably operated in the standby mode when the active area is outside of the geographic region. However, the electric discharge mechanism can be otherwise operated. Collocation of the active area and the geographic region can be determined based on timing, odometry, geographic location (e.g., through GPS), or any other suitable method. The method can additionally include selecting the treatment mechanism operation parameters for the electric discharge mechanism, as discussed above. For example, the electric discharge mechanism operation parameters can be determined based on system parameters (e.g., system speed, etc.), ambient environment parameters (e.g., humidity, temperature, soil conductivity, etc.), or any other suitable set of parameters. In a specific example, the amount of current can be selected based on system velocity.

d. Growth Regulator Application

In a third variation of the method, the plant treatment includes regulating plant growth by applying a growth regulator to the plant S130. The growth regulator can be specifically applied to a feature of the plant (e.g., the fruit, flower, stigma, style, stomata, top-facing leaves, young or old leaf, as determined from the color and/or shape, leaves proximal the ground, apical bud, terminal bud, node, etc.), applied to a plant portion (e.g., the top of the plant), or generally applied to the plant (e.g., be untargeted toward a specific plant portion). The growth regulator is preferably sprayed (e.g., misted) onto the plant, but can alternatively be brushed onto the plant, dusted onto the plant, rolled onto the plant, or otherwise applied to the plant. Alternatively, plant growth can be regulated by applying the growth regulator to the ambient environment, such as the atmosphere surrounding the plant, the substrate adjacent the plant, or any other suitable portion of the ambient environment. However, the growth regulator can be applied to any other suitable location.

Regulating plant growth S130 preferably includes identifying a plant within a geographic area S100, identifying a plant feature for use in treatment application S200, determining a set of operation parameters for a treatment mechanism S300, and operating the treatment mechanism in the treatment mode S400. More preferably, regulating plant growth S130 includes identifying a plant within a geographic area S100, identifying a plant feature for growth regulator application, determining a treatment position relative to the plant feature, and operating the treatment mechanism to apply the growth regulator to the plant. The growth regulator is preferably mixed into a working fluid, wherein the working fluid can be a liquid, such as water or another liquid, or a gas. The growth regulator can be a growth promoter (e.g., growth hormone, nitrogen, potassium, phosphorous, etc.), fertilizer, growth retardant, water, defoliators, bacteria, acid, base, organic material, salts, fumigant, fungicide, adjubants, gas, dust, or any other suitable growth regulation compound. The plant is preferably identified through the first measurement, as discussed above, but can alternatively be determined in any other suitable manner.

The plant feature is preferably identified in the manner discussed above, but can alternatively be determined in any other suitable manner. The plant feature is preferably identified from the first measurement, but can alternatively be determined from a second measurement. The plant feature can be identified from measurements of an entire side of a plant, the top-facing leaves of the plant, the top leaves of the plant, the leaves proximal the insertion point, a leaf inferior the insertion point, the leaves within a predetermined distance from substrate 70, or measurements of any other suitable plant portion. The growth regulator is preferably applied to the identified plant feature, but the plant feature can additionally or alternatively be used to identify a treatment position or used in any other suitable manner. Examples of plant features include leaves, flowers (e.g., corn silks), and stomata, but any other suitable plant feature can be identified. Any suitable number of plant features can be identified from one or more measurements.

Determining a treatment position relative to the plant feature functions to determine a position for the treatment mechanism that will result in growth regulator application to the plant feature. In a first variation, the treatment is to be applied to a broad surface of a leaf. The treatment position preferably is an interleaf insertion point, located between a top or first surface of a first leaf (e.g., superior the first leaf) and a bottom or second surface of a second leaf (e.g., inferior the second leaf), wherein the first leaf is targeted for treatment. In one example, identifying the interleaf position includes analyzing an optical image to identify a superior and inferior plant leaf and selecting a point between the superior and inferior plant leaves as the insertion point selecting a point between the superior and inferior plant leaves as the insertion point. Alternatively, the treatment position is the top of the plant, wherein the nozzle is positioned superior the plant along a gravity vector. The top of the plant can be determined from images, mechanical determination, or determined in any other suitable manner. Alternatively, the treatment position can be adjacent the plant or leaf, at an angle to the plant or leaf, below the plant or leaf, or be any other suitable position. In a second variation, the treatment is to be applied to a flower, wherein the treatment position is preferably proximal the flowers on the plant, more preferably above the flowers (e.g., superior the flowers along a gravity vector) but alternatively proximal (e.g., on substantially the same plane as the flowers relative to the gravity vector) or below the flowers (e.g., inferior the flowers along the gravity vector). However, any other suitable treatment position can be selected. The treatment position can additionally be selected based on ambient environment parameters. For example, in response to determination of a wind direction, the selected treatment position can be upwind of the targeted plant feature.

Figure 23A:
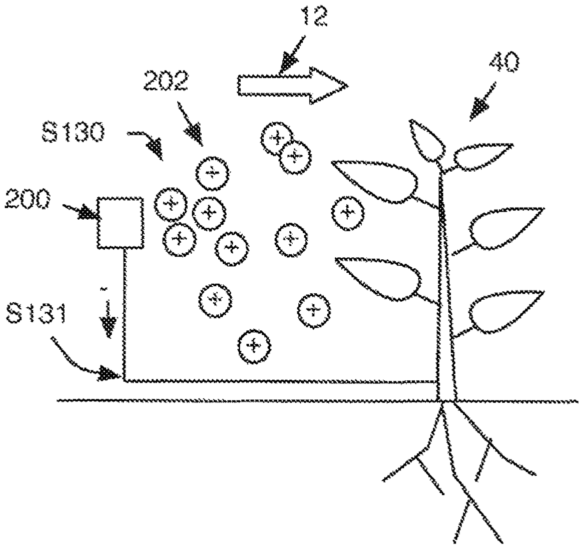
FIGS. 23A and 23B are schematic representations of: emitting charged droplets of a single polarity into the ambient environment surrounding a plant and electrically connecting the plant to the charging mechanism; and a circuit representative of the resultant system, respectively.
Figure 23B:
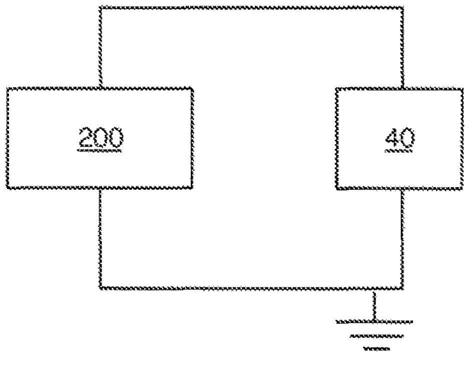

Operating the treatment mechanism to apply the growth regulator to the plant preferably includes actuating the treatment mechanism to align the active area with the treatment position and misting the growth regulator on the plant feature. Alternatively, operating the treatment mechanism to apply the growth regulator can include passively aligning the treatment mechanism active area with the treatment position by moving the entire system such that the treatment position is in range of the active area or the active area is aligned with the treatment position and spraying the growth regulator on the plant feature. Misting the growth regulator preferably includes forming droplets including growth regulator. Misting the growth regulator can additionally include charging the droplets. Misting the growth regulator can additionally include electrically connecting the system, as shown in FIG. 23A, more preferably the charging electrode but alternatively any other suitable system component, to the plant S131.

Forming the droplets function to generate droplets of the working fluid 202, wherein the working fluid preferably includes the growth regulator. The droplets can have a substantially uniform size (e.g., diameter) or have different sizes (e.g., wherein the droplet population has a size distribution). The droplets can be formed by aerosolizing the working fluid, electrospraying the working fluid (e.g., by forming a Taylor cone), or be otherwise formed.

The droplets can be charged or uncharged. Droplet charging can assist in aerosolization. Droplet charging can additionally or alternatively assist in targeted droplet application to the plant feature. The plurality of droplets are preferably charged to a single polarity (e.g., either positive or negative), but can alternatively be charged to different polarities. The droplets can be charged to the Rayleigh charge limit, such that the droplets aerosolize due to charge interactions. Alternatively, the droplets can be charged below the Rayleigh charge limit, to control droplet dispersion. The droplets can be charged before emission or after droplet generation, after emission or droplet generation, as the droplet is emitted from the treatment mechanism or nozzle 211, before droplet application to the plant, or after droplet application to the plant. Charging the droplet preferably includes generating an electric field having a higher field concentration at a point proximal the nozzle 211 and distal the electric field (e.g., with an electrode proximal the nozzle 211), but the droplets can be otherwise charged.

In variations in which the droplets are charged, the method can additionally include electrically connecting the system, more preferably the charging electrode but alternatively any other suitable system component, to the plant. The system can be electrically connected to the substrate 70, wherein the substrate 70 electrically connects the system to the plant. Alternatively, the system can be electrically connected to an accessible plant portion, such as a stem. Alternatively, the system can be electrically connected to the plant feature to which the growth regulator is to be applied. Alternatively, the system can be electrically connected to the plant in any other suitable manner.

Operating the treatment mechanism to apply the growth regulator to the plant can additionally include selecting treatment mechanism operation parameters, such as the working fluid emission pressure, the droplet size, the droplet charge, the nozzle position, the nozzle shape, the amount of growth regulator to be applied (e.g., growth regulator concentration, growth regulator mass, etc.), the duration of working fluid misting, or any other suitable parameter.

The treatment mechanism operation parameter value is preferably selected based on the target plant parameter. For example, a first fertilizer concentration can be selected in response to a determination to necrose the plant, while a second fertilizer concentration can be selected in response to a determination to stimulate plant growth, wherein the first concentration is preferably higher than the second concentration. Alternatively or additionally, the treatment mechanism operation parameter can be determined based on the plant age, growth stage, or based on any other suitable plant parameter. However, the treatment operation parameter value can be otherwise determined. The treatment mechanism operation parameter preferably includes the amount of growth regulator to be applied to the plant, but can alternatively or additionally include the duration of growth regulator application to the plant, the temperature, charge, or pressure of the growth regulator to be applied to the plant, or any other suitable parameter of growth regulator application. However, the treatment mechanism operation parameter can be any other suitable parameter.

In one variation, the treatment mechanism operation parameter value is selected based on a plant growth regulator capacity, or the capacity of the plant to receive the growth regulator without necrosing. The amount of growth regulator applied is preferably less than the plant growth regulator capacity, but can alternatively be equal to or more than the plant growth regulator capacity. Higher growth regulator concentrations and/or application durations are preferably selected for plants having higher plant growth regulator capacities, and lower growth regulator concentrations and/or application durations are preferably selected for plants having lower plant growth regulator capacities. Alternatively, higher growth regulator concentrations and/or longer application durations can be selected for younger plants, plants lagging behind in growth stages relative to other plants within the geographic area, or for any other suitable set of plants. However, the amount of growth regulator applied to the plant can be determined in any other suitable manner. The plant growth regulator capacity is preferably estimated, but can alternatively be empirically determined, selected from a chart, or otherwise determined. In one variation, the plant growth regulator capacity is determined based on the plant size. For example, a first plant growth regulator capacity is selected for a first plant with a first mass, and a second plant growth regulator capacity lower than the first is selected for a second plant with a second mass lower than the first.

In a second variation, the plant growth regulator capacity is determined based on a stomatal parameter. The stomatal parameter can be a stomatal opening parameter, a stomatal concentration on the plant feature or plant portion to which the treatment is to be applied, a number of stomata on the plant feature, a number of stomata on the plant, a stomatal distribution over the plant or plant feature, or any other suitable stomatal parameter. Examples of stomatal opening parameters include a degree (e.g., proportion) of stomatal opening for a set of stomata on the plant portion (e.g., leaf, set of leaves, etc.), the proportion of stomata in a set of stomata that are open beyond a threshold degree, and a degree of stomatal opening for each stomata (e.g., based on the ratio of the stomatal width to the maximum length of a stomatal pore and the pore area), but the stomatal opening parameter can include any other suitable measure of stomatal opening. Determining the stomatal parameter preferably includes recording an image of the plant portion (e.g., leaf) using multispectral, IR, or any other suitable image capturing method, identifying stomata within the image, and determining (extracting, recognizing, etc.) the stomata parameter for the plant portion from the image. For example, determining the stomatal opening parameter includes determining the stomata dimensions from the image and calculating the stomata parameter based on the extracted dimensions. However, the parameters can be otherwise determined. The determined plant growth regulator capacity is preferably inversely related to the stomatal opening parameter, wherein increased capacity is determined for lower degrees of stomatal opening and lower capacity is determined for higher degrees of stomatal opening.

The determined plant growth regulator capacity is preferably inversely related to the stomatal parameter value, but can alternatively be directly related. For example, increased capacities can be determined for lower degrees of stomatal opening, while lower capacities can be determined for higher degrees of stomatal opening.

The treatment mechanism operation parameter values can be selected based on the plant feature to be treated. For example, more growth regulator can be applied to older leaves than to younger leaves. Older leaves can be identified by coloration (e.g., wherein the older leaves are darker or have a higher brown to green ratio), spatial location on the plant (e.g., wherein the older leaves are located lower the plant, closer to the root system), or identified in any other suitable manner.

The treatment mechanism operation parameter values can be selected based on ambient environment parameters. For example, the droplet charges can be increased in response to increased wind speed. In another example, the droplet charge, emission pressure, size, or composition can be adjusted based on the ambient environment temperature and/or humidity. The treatment mechanism operation parameter values can additionally or alternatively be selected based on geographic area output parameter maximization. In particular, the treatment mechanism operation parameter values can be selected to maximize the target plant parameter value for the plant, and/or be selected based on the effect of the treatment on secondary plants 50, as discussed above. The treatment mechanism operation parameter values can be selected based on the system parameters, such as the system velocity. For example, the misting duration can be decreased in response to increased system velocity. In a second example, the growth regulator concentration in the working fluid can be increased in response to increased system velocity (e.g., due to the decreased misting duration). Alternatively, the treatment mechanism operation parameter values can be selected based on ambient environment parameters, such as temperature, humidity, ambient light, or any other suitable ambient environment parameter. For example, a first amount of growth regulator can be applied to the plant in response to a first ambient temperature, and a second, larger amount of growth regulator can be applied to the plant in response to a second, higher ambient temperature. The increased amount of growth regulator can accommodate for and/or take advantage of the increased internal plant rate. In another example, a first amount of growth regulator can be applied to the plant in response to a first ambient humidity, and a second, smaller amount of growth regulator can be applied to the plant in response to a second, higher ambient humidity. This can accommodate for the higher dew point due to the higher humidity. However, the treatment mechanism operation parameter values can be selected in any other suitable manner.

Operating the treatment mechanism to apply the growth regulator to the plant can additionally include mixing growth regulator into the working fluid to form a solution. The resultant growth regulator concentration is preferably determined based on the operation parameters, but can alternatively be predetermined or otherwise determined.

Operating the treatment mechanism to apply the growth regulator can additionally include applying the growth regulator to the same plant from a first and a second side. In a system variation in which the system traverses along the field furrows, the treatment is preferably applied to the plant from the first side during a first pass along a first furrow, and applied to the same plant from a second side during a second pass along a second furrow. In one variation, the method includes determining the target plant parameter value for the plant S510 in response to plant identification from a first angle, storing the target plant parameter, treating the plant from the first angle, and, in response to identifying the plant a second time from a second angle different from the first (e.g., opposing the first angle), treating the plant from the second angle based on the target plant parameter. Alternatively, the method can include in response to identifying the plant a second time, selecting a second set of operation parameters for the plant based on the first set of operation parameters, and operating the treatment mechanism in the application mode according to the second set of operation parameters. However, the plant can be treated from multiple angles in any other suitable manner. The plant is preferably identified the second time within a threshold time period after initial plant identification (e.g., within a time window from plant identification from the first angle, such as within the same operating session, within an hour, etc.), but can alternatively be identified at any other suitable time. The plant can be identified based on a unique identifier for the plant, such as a tag, a unique geographic position, a unique plant pattern (e.g., stomata, sunspots, leaf edge irregularities), or any other suitable identifier. Alternatively, the plant can be identified a second time, wherein the selected treatment or treatment parameters can be substantially independent from the previously selected treatment or treatment parameters for the plant.

In one variation, the plant feature is a set of leaves, wherein the leaf edges, petioles, or any other suitable leaf feature can be identified within the measurement. The leaf size and orientation are preferably estimated based on the identified leaf features, but can alternatively be measured (e.g., using LIDAR). The leaves are preferably subsequently used to determine interleaf insertion points.

The working fluid can be applied to the plant or to the ambient environment (e.g., area surrounding or adjacent the plant). In a first example, in response to identification of a plant (e.g., crop) for growth promotion, the method includes spraying the plant with a growth-promoting working fluid. Alternatively, the method can include spraying the area surrounding the crop with growth-retarding or necrosing working fluid (e.g., a large amount of fertilizer, a strong acid or base, salt, spraying the plant for a long duration, etc.). In a second example, in response to identification of an undesired plant for necrosis or growth retardation (e.g., a weed), the method includes spraying the plant with a growth-retarding or necrosing working fluid. Alternatively, the method can include spraying the area surrounding the undesired plant with a growth-promoting working fluid, such that the plants surrounding the undesired plant crowd out the undesired plant.

An alternative embodiment preferably implements the above methods in a computer-readable medium storing computer-readable instructions. The instructions are preferably executed by computer-executable components preferably integrated with a plant treatment system. The plant treatment system can include a plant identification system, output parameter optimization system, and treatment mechanism operation parameter determination system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:

classifying, by a computer, a plant in a first image by identifying a plant feature for the plant in a first plurality of pixels in the first image, the first plurality of pixels representing the plant in an area of a field, and the first image accessed from a detection mechanism of a farming machine capturing the first image on a pass moving through the field;

treating, on the pass, the plant by operating a treatment mechanism to apply a treatment to the plant classified by the computer;

accessing, from the detection mechanism a second image of the area of the field, the second image comprising a second plurality of pixels representing the plant and the treatment of the plant in the area of the field, the second image accessed from a verification mechanism of the farming machine capturing the second image on the pass moving through the field, wherein the verification mechanism is different from the detection mechanism;

identifying, by the computer and based on the second plurality of pixels, a treatment indicator in the second image, the treatment indicator representing an effectiveness of the treatment; and adjusting operating parameters of the treatment mechanism based on the treatment indicator.

2. The method of claim 1, further comprising:

accessing a reference indicator value indicative of an effective treatment; and comparing the treatment indicator to a reference indicator to determine if the treatment was effective.

3. The method of claim 1, wherein identifying the treatment indicator in the second image comprises applying an image processing algorithm to the second image.

4. The method of claim 1, wherein identifying the treatment indicator comprises identifying fluid application indicators in the second image.

5. The method of claim 1, wherein identifying the treatment indicator comprises identifying liquid on the plant.

6. The method of claim 1, wherein identifying the treatment indicator comprises identifying a spray blockage pattern of the treatment mechanism.

7. The method of claim 1, wherein identifying the treatment indicator comprises identifying a color change of a substrate in the field induced by the treatment.

8. The method of claim 1, wherein the detection mechanism comprises a thermal camera.

9. The method of claim 1, wherein the detection mechanism comprises a true color camera system.

10. The method of claim 1, wherein the detection mechanism comprises a stereo camera.

11. A farming machine comprising:

a detection mechanism configured to capture images of plants in a field as the farming machine moves through the field;

a treatment mechanism configured to treat plants in the field;

a verification mechanism configured to capture images of plants and plant treatments in the field as the farming machine moves through the field;

a control system comprising one or more processors, the control system configured to control operation of the detection mechanism and the treatment mechanism; and a non-transitory computer-readable storage medium comprising computer program instructions that, when executed by the one or more processors of the control system, cause the control system to:

classify, by a computer, a plant in a first image by identifying a plant feature for the plant in a first plurality of pixels in the first image, the first plurality of pixels representing the plant in an area of a field, and the first image accessed from a detection mechanism of a farming machine capturing the first image on a pass moving through the field;

treat, on the pass, the plant by operating a treatment mechanism to apply a treatment to the plant classified by the computer;

access, from the detection mechanism a second image of the area of the field, the second image comprising a second plurality of pixels representing the plant and the treatment of the plant in the area of the field, the second image accessed from a verification mechanism of the farming machine capturing the second image on the pass moving through the field, wherein the verification mechanism is different from the detection mechanism;

identify, by the computer and based on the second plurality of pixels, a treatment indicator in the second image, the treatment indicator representing an effectiveness of the treatment; and adjust operating parameters of the treatment mechanism based on the treatment indicator.

12. The farming machine of claim 11, wherein the computer program instructions, when executed, cause the one or more processors of the control system to:

access a reference indicator value indicative of an effective treatment; and compare the treatment indicator to a reference indicator to determine if the treatment was effective.

13. The farming machine of claim 11, wherein identifying the treatment indicator in the second image causes the one or more processors of the control system to apply an image processing algorithm to the second image.

14. The farming machine of claim 11, wherein identifying the treatment indicator causes the one or more processors of the control system to identify fluid application indicators in the second image.

15. The farming machine of claim 11, wherein identifying the treatment indicator causes the one or more processors of the control system to identify liquid on the plant.

16. The farming machine of claim 11, wherein identifying the treatment indicator causes the one or more processors of the control system to identify a spray blockage pattern of the treatment mechanism.

17. The farming machine of claim 11, wherein identifying the treatment indicator causes the one or more processors of the control system to identify a color change of a substrate in the field induced by the treatment.

18. The farming machine of claim 11, wherein the detection mechanism comprises a thermal camera.

19. The farming machine of claim 11, wherein the detection mechanism comprises a true color camera system.

20. A non-transitory computer-readable storage medium comprising computer program instructions that, when executed by one or more processors, cause the one or more processors to:

classifying, by a computer, a plant in a first image by identifying a plant feature for the plant in a first plurality of pixels in the first image, the first plurality of pixels representing the plant in an area of a field, and the first image accessed from a detection mechanism of a farming machine capturing the first image on a pass moving through the field;

treating, on the pass, the plant by operating a treatment mechanism to apply a treatment to the plant classified by the computer;

accessing, from the detection mechanism a second image of the area of the field, the second image comprising a second plurality of pixels representing the plant and the treatment of the plant in the area of the field, the second image accessed from a verification mechanism of the farming machine capturing the second image on the pass moving through the field, wherein the verification mechanism is different from the detection mechanism;

identifying, by the computer and based on the second plurality of pixels, a treatment indicator in the second image, the treatment indicator representing an effectiveness of the treatment; and adjusting operating parameters of the treatment mechanism based on the treatment indicator.

* * * * *